United States Patent
Leung et al.

(10) Patent No.: US 10,063,609 B2
(45) Date of Patent: Aug. 28, 2018

(54) METHODS AND APPARATUS FOR MULTIMEDIA CONFERENCES USING SINGLE SOURCE MULTI-UNICAST

(71) Applicant: QUALCOMM Incorporated, San Diego, CA (US)

(72) Inventors: Nikolai Konrad Leung, San Francisco, CA (US); Venkatraman Srinivasa Atti, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 15/227,894

(22) Filed: Aug. 3, 2016

(65) Prior Publication Data

US 2017/0054777 A1     Feb. 23, 2017

Related U.S. Application Data

(60) Provisional application No. 62/207,343, filed on Aug. 19, 2015, provisional application No. 62/354,655, filed on Jun. 24, 2016.

(51) Int. Cl.
*H04L 29/06*       (2006.01)
*H04M 7/00*        (2006.01)
*H04L 12/18*       (2006.01)

(52) U.S. Cl.
CPC ........ *H04L 65/601* (2013.01); *H04L 12/1818* (2013.01); *H04L 65/403* (2013.01); *H04M 7/0072* (2013.01)

(58) Field of Classification Search
CPC . H04L 65/403; H04L 65/601; H04L 12/1818; H04M 7/0072
See application file for complete search history.

(56) References Cited

U.S. PATENT DOCUMENTS

| | | | | |
|---|---|---|---|---|
| 7,627,629 B1 * | 12/2009 | Wu | ..................... | H04L 12/1818 348/14.09 |
| 9,185,346 B2 * | 11/2015 | Grondal | .............. | H04L 65/1083 |
| 2006/0245378 A1 * | 11/2006 | Jeong | .................. | H04Q 3/0045 370/261 |

(Continued)

FOREIGN PATENT DOCUMENTS

WO    WO-2006116750 A2    11/2006

OTHER PUBLICATIONS

International Search Report and Written Opinion—PCT/US2016/045582—ISA/EPO—dated Nov. 7, 2016.

*Primary Examiner* — Kevin C Harper
*Assistant Examiner* — Derrick V Rose
(74) *Attorney, Agent, or Firm* — Knobbe, Martens, Olson & Bear LLP

(57) ABSTRACT

Methods and apparatus are disclosed for communication in a conference using a single source multi-unicast architecture. In one aspect, a method for communication between participants in a conference is provided. The method includes receiving, from a first device, a first message for establishing a conference, the first message including a list of codec types for use in the conference. The method further includes transmitting, at a second device, a second message to a third device, the second message offering one or more codec types from the list of codec types. The method further includes processing, at the second device, a first data stream having a first codec type from the one or more codec types.

15 Claims, 15 Drawing Sheets

(56) References Cited

U.S. PATENT DOCUMENTS

| | | | |
|---|---|---|---|
| 2008/0239062 A1* | 10/2008 | Civanlar | H04N 7/152 348/14.09 |
| 2011/0167104 A1* | 7/2011 | Gupta | H04L 65/4061 709/203 |
| 2012/0300015 A1 | 11/2012 | Chen et al. | |
| 2015/0229487 A1* | 8/2015 | Lickliter | H04L 12/1827 709/203 |

* cited by examiner

METHODS AND APPARATUS FOR MULTIMEDIA CONFERENCES USING SINGLE SOURCE MULTI-UNICAST

CROSS-REFERENCE TO RELATED APPLICATION INFORMATION

The present Application for Patent claims priority to Provisional Application No. 62/207,343 entitled "METHODS AND APPARATUS FOR MULTIMEDIA CONFERENCES USING SINGLE SOURCE MULTI-UNICAST" filed Aug. 19, 2015, and Provisional Application No. 62/354,655 entitled "METHODS AND APPARATUS FOR MULTIMEDIA CONFERENCES USING SINGLE SOURCE MULTI-UNICAST" filed Jun. 24, 2016, both of which are expressly incorporated by reference herein.

FIELD

This disclosure relates to the field of codec negotiation, and particularly to multicast communications in multimedia conferences.

BACKGROUND

Digital video and audio capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video and audio devices implement video and audio compression techniques, such as those described in the standards defined by Moving Picture Experts Group-2 (MPEG-2), MPEG-4, International Telegraph Union-Telecommunication Standardization Sector (ITU-T) H.263, ITU-T H.264/MPEG-4, Part 10, Advanced Video Coding (AVC), the High Efficiency Video Coding (HEVC) standard, and extensions of such standards. The video and audio devices may transmit, receive, encode, decode, and/or store digital video and audio information more efficiently by implementing such video and audio coding techniques.

Video and audio coding standards, such as Scalable HEVC (SHVC) and Multiview HEVC (MV-HEVC), provide level definitions for defining decoder capability. In the following, the issues and solutions are described based on the existing level definition and other contexts of SHVC at the time when the invention was made, but the solutions apply to MV-HEVC, and other multi-layer codecs as well.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides a method for communication between participants in a conference. The method includes receiving, from a first device, a first message for establishing a conference, the first message including a list of codec types for use in the conference. The method further includes transmitting, at a second device, a second message to a third device, the second message offering one or more codec types from the list of codec types. The method further includes processing, at the second device, a first data stream having a first codec type from the one or more codec types.

Another aspect of the subject matter described in the disclosure provides an apparatus for communicating in a conference. The apparatus includes a receiver configured to receive, from a first device, a first message for establishing a conference, the first message including a list of codec types for use in the conference. The apparatus further includes a transmitter configured to transmit a second message to a third device, the second message offering one or more codec types from the list of codec types. The apparatus further includes a processor configured to process a first data stream having a first codec type from the one or more codec types.

Another aspect of the subject matter described in the disclosure provides an apparatus for communicating in a conference. The apparatus includes receiving, from a first device, a first message for establishing a conference, the first message including a list of codec types for use in the conference. The apparatus further includes means for transmitting, at a second device, a second message to a third device, the second message offering one or more codec types from the list of codec types. The apparatus further includes means for processing, at the second device, a first data stream having a first codec type from the one or more codec types.

Another aspect provides a non-transitory computer-readable medium. The medium includes code that, when executed, causes an apparatus to perform a method. The method includes receiving, from a first device, a first message for establishing a conference, the first message including a list of codec types for use in the conference. The method further includes transmitting, at a second device, a second message to a third device, the second message offering one or more codec types from the list of codec types. The method further includes processing, at the second device, a first data stream having a first codec type from the one or more codec types.

Another aspect provides a method for communication in a conference. The method includes receiving via a simulcast transmission, at a first device, a first data stream having a first codec type and a second data stream having a second codec type from a second device. The method further includes selecting, at the first device, the first or second data stream and processing, at the first device, the selected first or second data stream. The method may further include selecting the first or second data is based on a characteristic of the first data stream or based on a characteristic of the second data stream. The characteristic of the first data stream may comprise a codec type and the characteristic of the second data stream may comprise a codec type.

Another aspect provides a method for communication between participants in a conference. The method includes receiving, from a first device, a first message, the first message including a list of codec types for use in the conference, the first message identifying which codecs in the list of codec types are mandatory codec types and are optional codec types.

The method may further include an aspect where the first message includes a delimiter identifying which codecs in the list of codec types are mandatory codec types and are optional codec types.

The method may further include an aspect where a location of the delimiter in the list of codec types identifies which codecs in the list of codec types are mandatory codec types and are optional codec types.

The method may further include an aspect where the delimiter in the list of codec types identifies the mandatory codec types.

The method may further include an aspect where the first message includes a parameter identifying which codecs in the list of codec types are the mandatory codec types and are the optional codec types.

The method may further include an aspect where the parameter is 'con_rev', and wherein an order of codecs in the list of codec types identifies which codecs are the mandatory codec types and are the optional codec types.

The method may further include an aspect where the parameter is 'mand_recv', and wherein codecs in the list of codec types that are listed with the parameter are the mandatory codec types.

Another aspect provides a method for communication between participants in a conference. The method includes receiving, from a first device, a first message for establishing a conference, the first message including a list of codec types for use in the conference, the list of codec types including at least one optional codec type, transmitting, at a second device, a second message to a third device, the second message offering a simulcast stream including the at least one optional codec type and a corresponding mandatory codec types from the list of codec types, and receiving, from the third device, the simulcast stream including the at least one optional codec type and the corresponding mandatory codec type.

Another aspect provides a method for communication between participants in a conference. The method includes receiving, at a first device, a plurality of data streams from a first subset of the conference, transmitting, at the first device, the plurality of data streams to the conference, receiving, at the first device, a first data stream from a second subset of the conference, pausing transmission of one data stream of the plurality of data streams, reusing the paused data stream for transmission of the first data stream, replacing the first data stream with one or more silence indicator (SID) frames, and resuming transmission of the first data stream.

Another aspect provides a method for communication between participants in a conference. The method includes receiving, from a first device, a first message for establishing a conference, the first message including a list of codec types for use in the conference, transmitting, at a second device, a second message to a third device, the second message offering less than all of the one or more codec types from the list of codec types, receiving, at the second device, a third message from the third device listing a codec type not listed in the second message, and transmitting, at the second device, a first data stream having the codec type not listed in the second message.

Another aspect of the method is where the codec type listed in the third message is in the list of codec types in the first message.

Another aspect of the method is where the first data stream is transmitted to the third device.

Another aspect of the method is where the second message only includes EVS.

Another aspect of the method is where the codec type listed in the third message is AMR-WB.

DETAILED DESCRIPTION

Figure 1:
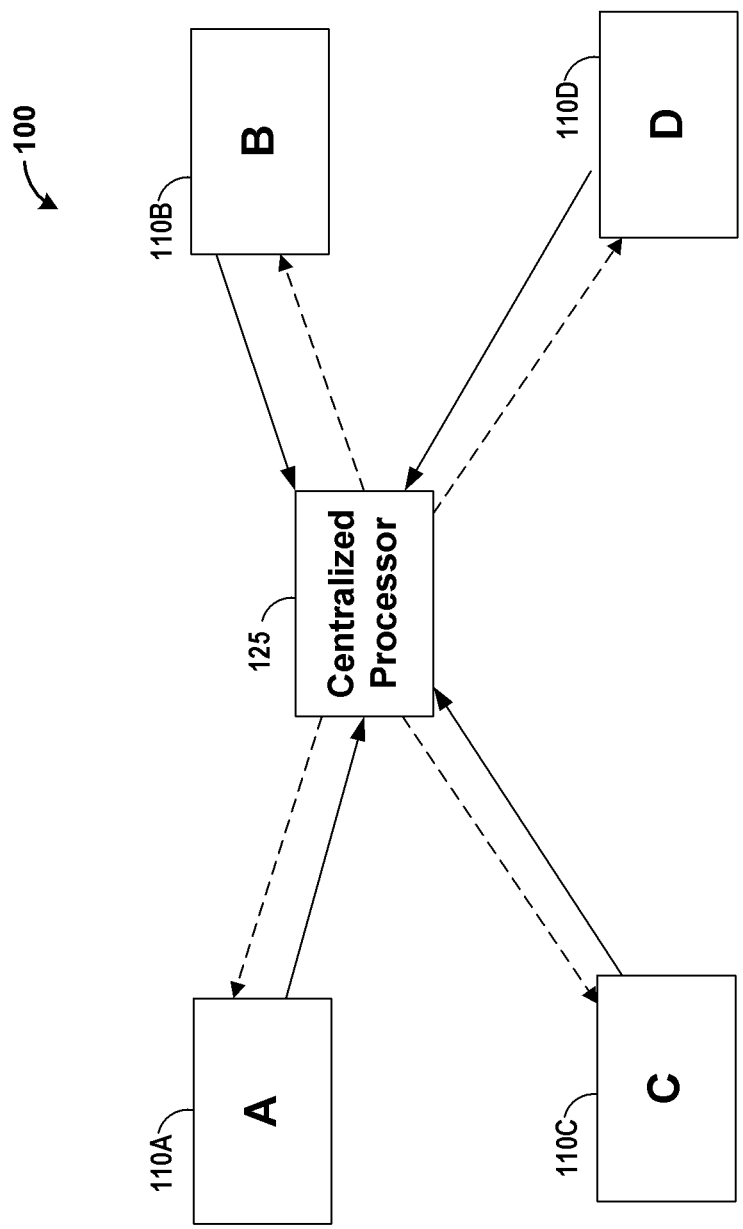
FIG. 1 illustrates an example of a conference architecture for multiple participants.

The detailed description set forth below in connection with the appended drawings is intended as a description of certain implementations of the invention and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the disclosed implementations. In some instances, some devices are shown in block diagram form.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, a video coding standard, namely High Efficiency Video Coding (HEVC), has been developed by the Joint Collaboration Team on Video Coding (JCT-VC) of ITU-T Video Coding Experts Group (VCEG) and ISO/IEC MPEG. The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The multiview extension to HEVC, namely MV-HEVC, and the scalable extension to HEVC, named SHVC, are also being developed by the JCT-3V (ITU-T/ISO/IEC Joint Collaborative Team on 3D Video Coding Extension Development) and JCT-VC, respectively. A recent Working Draft (WD) of MV-HEVC will be referred to hereinafter as MV-HEVC WD7. A recent WD of SHVC will be referred to hereinafter as SHVC WD5.

Existing approaches to level definitions sometimes do not provide sufficient information to define decoder capabilities for efficient decoding of multi-layer bitstreams. For example, to decode more than 4 signal-to-noise ratio (SNR) scalable layers (layers having equivalent resolution) of 720p resolution each, a Level 5 decoder or above would be required. Consequently, the luminance coding tree block (CTB) size would be equal to 32×32 or 64×64 (i.e., smaller coding sizes such as 16×16 cannot be used). However, for some layers, such as those having resolutions of 720p or lower, this restriction may result in sub-optimal coding efficiency.

Decoders may be manufactured in some instances by reusing multiple existing single-layer decoders. In an example, an SHVC decoder consisting of 4 single-layer HEVC Level 3.1 decoders would have to conform to Level 4 or above to decode 4 SNR layers of 720p, per the existing level definition. By this definition, the decoder would have to be able to decode any Level 4 bitstreams. However, barring changes to the decoder hardware, such a decoder would not be able to decode an SHVC Level 4 bitstream with 2 SNR layers of 1080p resolution.

Another issue with the existing HEVC level definition is that a decoder implemented in such a way as to be capable of decoding both a single-layer HEVC bitstream of 1080p and a two-layer SHVC bitstream of 720p would be labeled Level 3.1. However, the Level 3.1 label does not express the capability to decode a single-layer bitstream of 1080p.

In another example, for a decoder implemented using 4 single-layer HEVC 3.1 decoders to be able to decode 4 SNR layers of 720p, per the existing level definition, the decoder would have to conform to Level 4 or above. Thus, the decoder would be required to be able to decode bitstreams having more than 3 tile rows and more than 3 tile columns, each tile having a width of 256 luma samples and height of 144 luma samples. However, the Level 3.1 limits of the decoder would not be able to decode some such bitstreams.

Under the existing design of SHVC, all items in subclause A.4.1 of the HEVC text are specified to be applied to each layer. However, some items are not directly applicable to each layer. For example, for item d on decoded picture buffer (DPB) size, the Sequence Parameter Set (SPS) syntax element is not applicable for enhancement layers. Also, the DPB in SHVC WD5 is a shared-sub-DPB design, thus item d cannot be directly applied to each layer. As another example, for items h and i on Coded Picture Buffer (CPB) size, for bitstream-specific CPB operations, the parameter cannot be applied to each layer.

Bitstream-specific restrictions on CPB size (by items h and i in subclause A.4.1 of HEVC text) are needed. However, the items h and i in subclause A.4.1 of HEVC text cannot be directly applied on bitstream level, because if directly applied, the same CPB size limit for single-layer bitstreams would also be the limit for multi-layer bitstreams. This is not scalable to the number of layers and would only allow for low picture quality when there are many layers.

The restrictions by items b, c, d, g, h, i, and j in subclause A.4.2 of HEVC text are specified to be layer-specific only. However, bitstream-specific restrictions by these items should be specified, regardless of whether their layer-specific counterparts are specified.

While certain embodiments are described herein in the context of the HEVC and/or H.264 standards, one having ordinary skill in the art may appreciate that systems and methods disclosed herein may be applicable to any suitable video coding standard or non-standard video codec design. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) MPEG 1 Visual, ITU-T H.262 or ISO/IEC MPEG-2 Visual, ITU-T H.263, ISO/IEC MPEG 4 Visual and ITU-T H.264 (also known as ISO/IEC MPEG-4 AVC), including the scalable and multiview extensions.

HEVC generally follows the framework of previous video coding standards in many respects. The unit of prediction in HEVC is different from the units of prediction (e.g., macroblocks) in certain previous video coding standards. In fact, the concept of a macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

For purposes of illustration only, certain embodiments disclosed herein are described with examples including only two layers (e.g., a lower layer such as the base layer, and a higher layer such as the enhancement layer) of video and/or audio data. A "layer" of video data may generally refer to a sequence of pictures having at least one common characteristic or parameter, such as a view, a frame rate, a resolution, or the like. For example, a layer may include video data associated with a particular view (e.g., perspective) of multi-view video data. As another example, a layer may include video data associated with a particular layer of scalable video data. Thus, this disclosure may interchangeably refer to a layer and a view of video data. That is, a view of video data may be referred to as a layer of video data, and a layer of video data may be referred to as a view of video data. In addition, a multi-layer codec (also referred to as a multi-layer video coder or multi-layer encoder-decoder) may jointly refer to a multiview codec or a scalable codec (e.g., a codec configured to encode and/or decode video data using MV-HEVC, 3D-HEVC, SHVC, or another multi-layer coding technique). Video encoding and video decoding may both generally be referred to as video coding. It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impossible. To reduce the amount of information to be transmitted, a number of different compression methods, such as JPEG, MPEG and H.263 standards, have been developed. Video coding standards include those previously recited herein.

Multi-Stream Multiparty Conferencing

In some embodiments, in a multi-stream multiparty conference it may be desirable to support multi-stream video, at least two video contents (e.g., one main and one presentation), multi-stream audio, at least 2 audio contents, as well as other additional capabilities. In some aspects, a centralized processor or bridge may act to support these functions. The centralized processor or bridge may receive the multi-stream video/audio data, mix the video/audio data and send the mixed data stream to each of the participants.

FIG. 1 is a diagram of an exemplary conference architecture 100 for multiple participants. The conference architecture 100 includes terminals 110A-D and the centralized processor 125. In some aspects, the centralized processor 125 may comprise a server or a conference bridge provider. The centralized processor 125 may receive data streams from each of the terminals 110A-D, decode, mix and transmit the mixed data stream to the terminals 110A-D. In some aspects, the centralized processor 125 may transmit the mixed data stream using a multicast transmission. In some embodiments, a data stream may comprise one or more audio, video, and/or media streams.

Figure 1A:
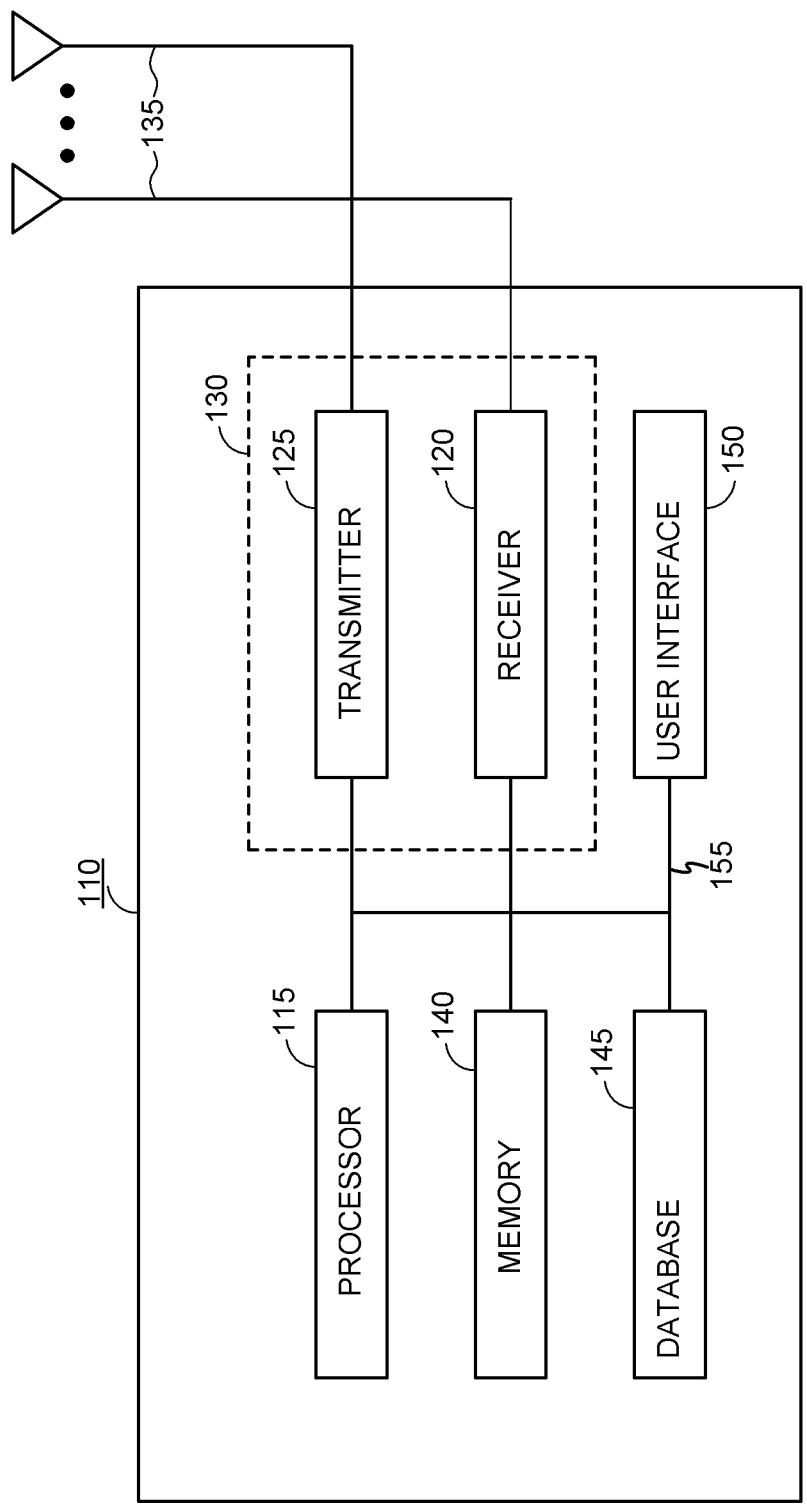
FIG. 1A illustrates various components that may be utilized in a terminal that may be employed within the conference architectures disclosed herein.

FIG. 1A illustrates various components that may be utilized in a terminal 110A-D that may be employed within the conference architectures disclosed herein. In some aspects, the terminals 110A-D may each comprise one or more of a processor 115, a receiver 120, a transmitter 125, a transceiver 130, an antenna 135, a memory 140, a database 145, and a user interface 150. The terminal 110A-D is an example of a device that may be configured to implement the various methods described herein. The terminal 110A-D may implement the centralized processor 125.

The terminal 110A-D may include the processor 115 which controls operation of the terminal 110A-D. The processor 115 may also be referred to as a central processing unit (CPU). In some implementations, the terminal 110A-D may additionally comprise memory 140, which may include both read-only memory (ROM) and random access memory (RAM), provides instructions and data to the processor 115. A portion of the memory 140 may also include non-volatile random access memory (NVRAM). The processor 115 may perform logical and arithmetic operations based on program instructions stored within the memory 140. The instructions in the memory 140 may be executable to implement the methods described herein.

The processor 115 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processor 115 and/or memory 140 may also include a non-transitory, computer-readable medium comprising code that, when executed, causes an apparatus or the processor 115 to perform any method described in the present application. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The terminal 110A-D may also include a transmitter 125 and a receiver 120 to allow transmission and reception of data between the terminals 110A-D and the centralized processor 125. The transmitter 125 and the receiver 120 may be combined into a transceiver 130. A single or a plurality of transceiver antennas 135 may be electrically coupled to the transceiver 130. Thus, in some implementations, the transmitter 125 may comprise or form at least a portion of means for transmitting a message. Likewise, the receiver 120 may comprise or form at least a portion of means for receiving a message.

The terminal 110A-D may also include a database 145 and a user interface 150. The various components of the terminal 110A-D may be coupled together by a bus system 155, which may include a power bus, a control signal bus, and a status signal bus in addition to a data bus.

In some embodiments, it may be desirable to establish a multi-stream multiparty conference without the centralized processor 125. For example, the centralized processor 125 may require separate infrastructure and services that may add cost and/or complexity. Additionally, participants may be required to establish or register with the centralized processor 125 prior to the multi-stream multiparty conference. Accordingly, it may be desirable for participants to establish a multi-stream multiparty conference on their terminals (e.g., computer, tablet, smartphone, other user equipment, etc.) without using the centralized processor 125 (e.g., decentralized conference).

Figure 2:
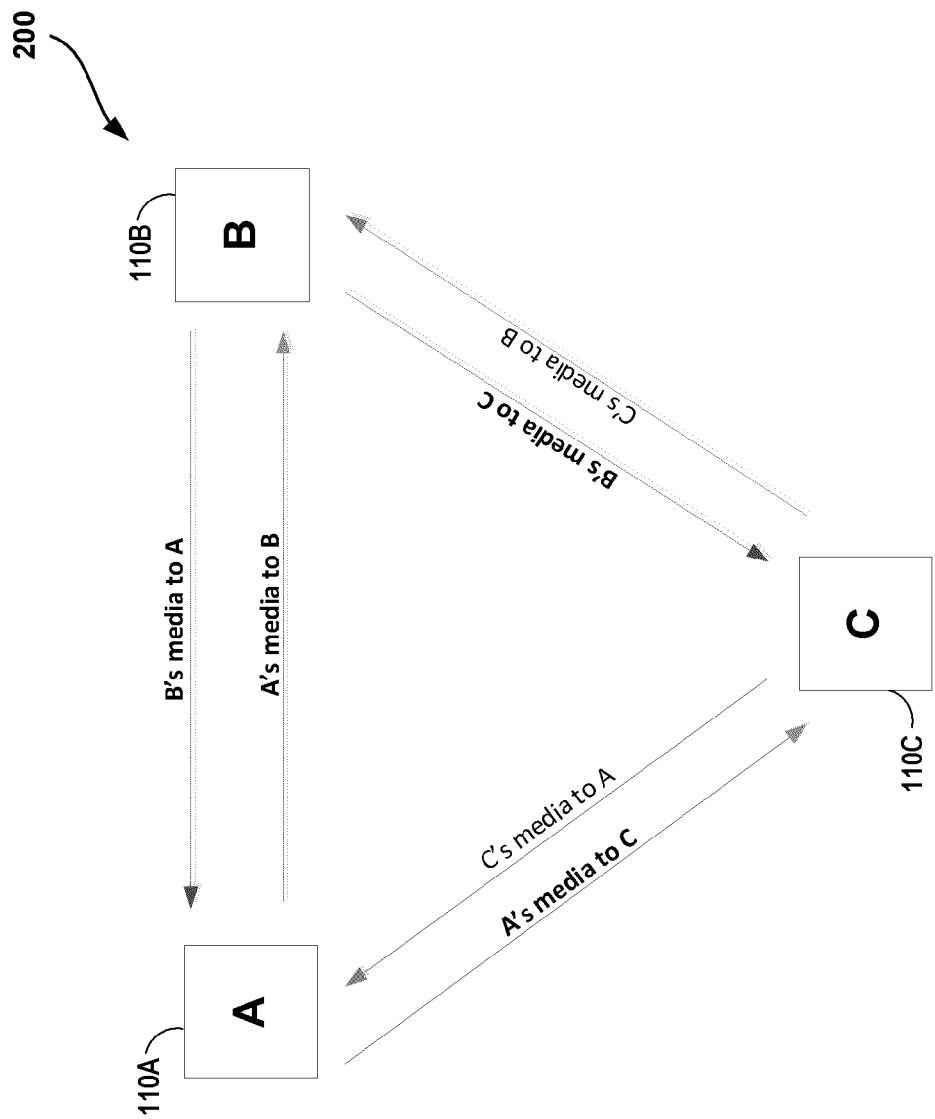
FIG. 2 illustrates an example of a decentralized conference architecture for multiple participants.

FIG. 2 is a diagram of an example of a decentralized conference architecture 200 for multiple participants. As shown in FIG. 2, the decentralized conference architecture 200 may include terminals 110A, 110B, and 110C. The terminals 110A, 110B, and 110C may exchange data streams with each other and may decode, encode, and/or mix the data streams it receives and/or sends. For example, as shown in FIG. 2, terminal 110A receives data streams from terminals 110B and 110C and transmits data streams to terminals 110B and 110C. The data streams may comprise media streams, audio streams, video streams, or any combination of such streams. These multiple data streams may be independently and concurrently decoded then mixed together at each terminal, preferably with some perceptual spatial-separation, before rendering the mixed data stream to the viewer or listener. Each of the terminals 110A, 110B, and 110C may have computational limits on the number of decoder/encoder instances that they can operate concurrently. In some aspects, it may be desirable to take these limits into account by a conference initiator when setting up a multi-stream multiparty conference with in-terminal mixing (e.g., a decentralized conference).

As described above with respect to FIG. 2, each of the terminals 110A, 110B, and 110C may be required to concurrently decode multiple data streams received from the other conference participants. Each terminal 110 may have a computational limit to the number of decoder instances it can operate concurrently. This limits the number of participants that can be in a conference with the terminal, or requires that the terminal has the ability to prioritize decoding certain data streams and ignore others. For example, if a terminal does not ignore any data streams it receives, the number participants must be less than or equal to the maximum number of decoders plus one (N<=MaxDec+1). Where N is the number of participants in the conference, including the conference initiator and MaxDec is the maximum number of decoders that can be run concurrently by the terminal. In some embodiments, terminal 110A may initiate a conference by connecting with terminals 110B and 110C and then terminals 110B and 110C may connect with each other to complete the conference.

With reference to FIG. 2, if terminal 110A is the conference initiator, the terminal 110A may use the above calculation to determine how many callers/terminals to invite to the conference (i.e., N−1). Furthermore, if each of the other terminals (e.g., terminals 110B and 110C) does not prioritize or ignore data streams it receives, each terminal may also be able to decode N−1 data streams. Therefore, it may be desirable for the initiator terminal 110A to consider the following limitation: N<=Min [MaxDec of each terminal]+1. Thus, terminal 110A, as the conference initiator, accounts for the maximum number of decoders that can be run concurrently by each participating terminal in the conference and can ensure that the number of participants does not exceed the smallest maximum number of decoders plus one.

Similarly, conferences with in-terminal mixing can require that a terminal concurrently encode multiple data streams that are sent to the other participating terminals. This can happen when the initiator offers more than one type of codec for a data type and the other participants select to use different codecs. In some aspects, a data type may comprise an audio type, a video type, or other media type.

Figure 3:
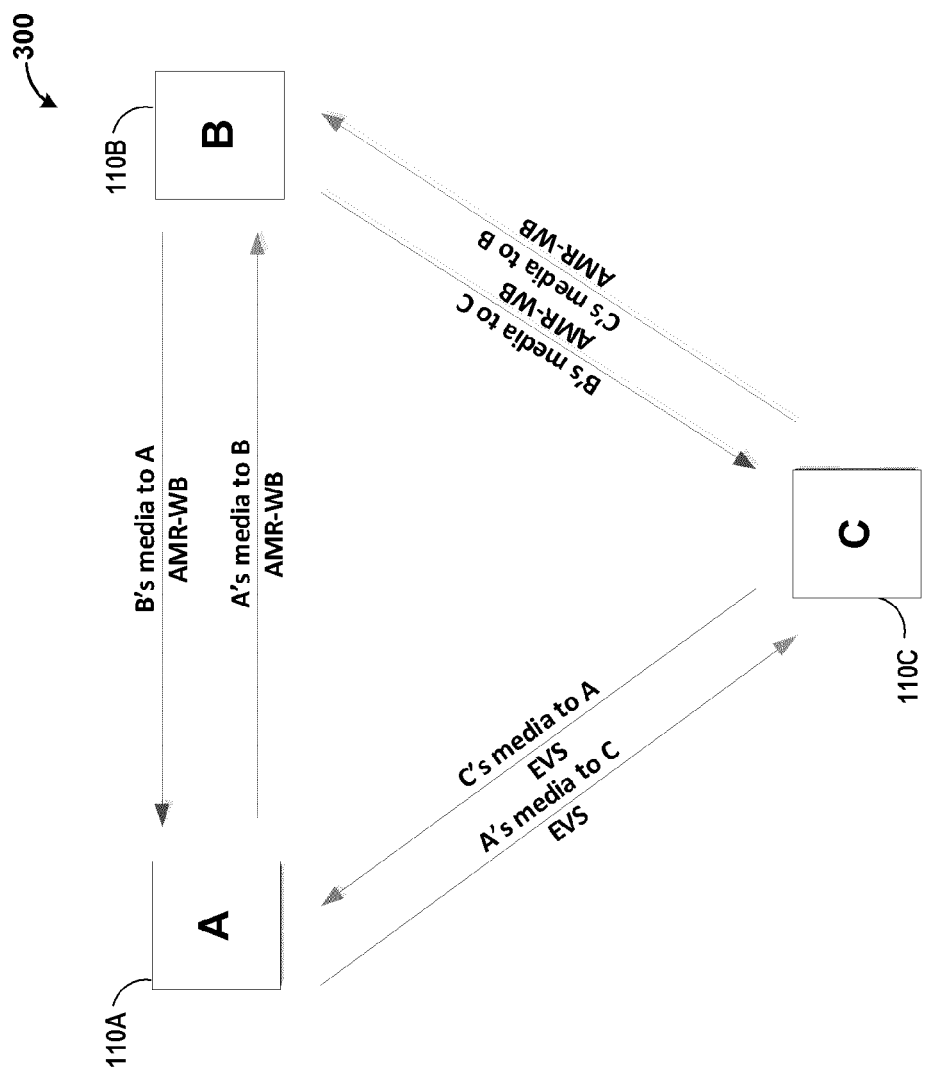
FIG. 3 illustrates another example of a decentralized conference architecture for multiple participants.

FIG. 3 illustrates another example of a decentralized conference architecture 300 for multiple participants. In some embodiments, the terminal 110A, as the initiator terminal, may offer one or more codecs to the terminals 110B and 110C. For example, as shown in FIG. 3, the terminal 110A offers both an enhanced voice services (EVS) codec and an adaptive multi-rate wideband (AMR-WB) to terminals 110B and 110C. In some aspects, the offer may comprise a session description protocol (SDP) offer message or first message. As shown, terminal 110C supports EVS and responds with a message selecting EVS. Terminal 110B may only support AMR-WB and select AMR-WB in its response to terminal 110A. In some aspects, the messages terminals 110B and 110C send in response to the offer from terminal 110A may comprise an SDP answer message. Terminals 110B and 110C may also perform their own codec negotiation (e.g., set-up via the session initiation protocol (SIP) REFER method from terminal 110A) resulting in the selection of AMR-WB since terminal 110B does not support EVS. As can be seen from FIG. 3, terminals 110A and 110C have to both encode their content in the EVS and AMR-WB formats concurrently while terminal 110B need only encode/decode in the AMR-WB format.

As described above, in some embodiments terminals may establish a conference session without a centralized processor or central focus by using the SIP REFER method. In some aspects, the initiator terminal (e.g., terminal 110A) first establishes one-to-one SIP dialogs with each of the other (N−1) participants (terminals 110B and 110C). Once the dialogs are established, terminal 110A then issues multiple SIP REFER messages (first message, second message, third message, etc.) to each of the other participants requesting them to establish a session with each of the other (N−2) participants. This is done by including the SIP uniform resource identifier (URI) indicating SIP INVITE messages to the other terminals 110B and 110C as the "Refer-To URI."

For example, terminal 110A may issue a REFER message to terminal 110B, requesting terminal 110B to send an INVITE message to terminal 110C. For redundancy and to minimize conference set-up delay, terminal 110A may also send a reciprocal REFER message to terminal 110C, requesting terminal 110C to send an INVITE message to terminal 110B. If there were more participants, e.g., a fourth terminal 110D, terminal 110A would send at least one additional REFER message each to terminal 110B and terminal 110C requesting that they also send INVITE messages to terminal 110D. In some aspects, to introduce redundancy and minimize conference set-up delay, terminal 110A should also send a REFER to terminal 110D requesting that it also send INVITE messages to terminals 110B and 110C.

In some embodiments, when redundant INVITE messages are requested by the initiator terminal 110A via the REFER messages, a terminal that receives a REFER message requesting it to send an INVITE message to a terminal from which it has already received an INVITE message should no longer send an INVITE message to that terminal.

In some aspects, to decrease overall SIP signaling load in the network at the cost of potentially increasing the conference set-up time, the initiator terminal 110A may decide not to request redundant INVITE messages be sent among the participants. For example, if the participants are numbered 1 to N, with 1 being the initiator terminal 110A, the initiator terminal 110A sends the following:

A REFER message to terminal 2 requesting that it send INVITE messages to terminals 3 to N A REFER message to terminal 3 requesting that it send INVITE messages to terminals 4 to N

. . . .

A REFER to terminal M requesting that it send INVITE messages to terminals M+1 to N

. . . .

A REFER message to terminal N−1 requesting that it send an INVITE to terminal N.

In some embodiments, when issuing REFER requests, the terminal 110A may not send a REFER message to each participant in the conference (e.g., terminals 110B and 110C) giving them each the identities of the other (N−2) participants. In some aspects, the following procedure can be followed:

1. The initiator terminal (e.g., terminal 110A) constructs an ordered list of conference participants (e.g., terminals 110B and 110C) and identifies each participant terminal by its position in this list. In some aspects, the list comprises a list of the URI associated with each participant. Assuming the conference contains N participants including the initiator terminal, the initiator terminal may be positioned at the top of the list (position 1). In some aspects, the initiator terminal already has a 1-1 session with each of the (N-1) participants.

2. The initiator terminal (e.g., terminal 110A) sends a REFER message to (N-2) participants that are numbered 2, 3, ..., (N-1). For example, as shown in FIG. 3, terminal 110A would send one REFER message (i.e., 3-2) to the participant terminal 110B (e.g., for terminal 110B numbered 2 and terminal 110C numbered 3). In some aspects, each REFER message may contain a URI list of different lengths. The URI list sent to participant terminal i (where 2<=i<=(N-1)) contains (N-i) entries. The URI list may comprise URIs of the participant terminals numbered (i+1), (i+2), ... N. For example, as shown in FIG. 3, the URI list sent to terminal 110B (i.e., terminal 2) may comprise the URI of terminal 110C (i.e., terminal 3).

3. Upon reception of the REFER message, each participant terminal may send INVITE messages to the list of participant terminals provided to it by the initiator terminal and session set up proceeds normally. Continuing the example from FIG. 3, terminal 110B (i.e., terminal 2) may send an INVITE message to terminal 110C (i.e., terminal 3) which was listed in the REFER message sent by terminal 110A (initiator terminal).

In the above procedure, it may be possible to minimize the total amount of signalling generated to establish the N-way session from (N-1)*(N-1) to N*(N-1)/2. In some aspects, participant N (e.g., terminal 110C of FIG. 3) does not receive any REFER message, but only receives INVITE messages from the other (N-2) participants (e.g., terminal 110B of FIG. 3). In some embodiments, if redundancy is desired, then the URI list in a REFER message can be lengthened to allow some overlap. When the length of URI list in the REFER message is the same for all participants, full redundancy may exist. For example, in the scenario above, the URI list sent to participant i could be made to be (N-i+1) terminals. In such embodiments, each participant would get the complete URI list so that it is aware of the identities of all other participants. However, it sends out an INVITE message only to those terminals that appear in the list after its own identity and waits to receive the INVITE message from those terminals whose identities appear before its own identity in the list. In case no INVITE message is received from such a terminal, this terminal could send an INVITE message towards that terminal.

For terminal 110A (initiator terminal), it may be desirable to consider the following limitation: the minimum of the number of types of codecs it offers and the value of N-1, should be less than or equal the maximum number of encoders that can be run concurrently by the terminal 110A (Min [# of types of codecs in the offer, (N-1)]<=MaxEnc). Where MaxEnc is the maximum number of encoders that can be run concurrently by the terminal 110A. For example, if the terminal 110A can offer 3 types of codecs and there are 3 total participants, then the minimum of the number of types of codecs it offers and the value of N-1 would equal 2 which would be less than or equal to the maximum number of encoders that can be run concurrently by the terminal 110A.

Additionally, as was discussed above with respect to decoding with multiple terminals, it may be desirable for the terminal 110A to consider that the number of types of codecs should also be less than the MaxEnc of each terminal involved in the conference. Therefore the following limit should be followed: Min [# of types of codecs in the offer, (N-1)]<=Min [MaxEnc of each terminal].

In some embodiments, it may be desirable for the terminal 110A (initiator terminal) to consider additional constraints. For example, for a given data type, the different types of codecs may have different computational complexity requirements. For example, the EVS codec is more complex than the AMR-WB codec. This may require that the conference initiator (terminal 110A) consider the following for each codec it includes in an offer message: the minimum of the maximum number of encoders that can be run concurrently by the terminal 110A of each codec and the minimum of the maximum number of decoders that can be run concurrently by the terminal 110A of each codec. The above may also be expressed as: Min [MaxEnc of each coded] and Min [MaxDec of each coded]. In some aspects, each terminal may communicate its MaxEnc and MaxDec for each of the codecs it supports.

In a decentralized conference, a terminal performs both encoding and decoding. If these processes run on the same processors, then the MaxEnc and MaxDec may depend on how many instances of each operation (encode/decode) are running. Conceptually, the limitation can be generalized as follows: Complexity [operational encoders+operational decoders]<=Complexity Limit. That is, the complexity of the operational encoders plus the complexity of the operational decoders should be less than or equal to the complexity limit for the terminal.

In one embodiment, a terminal can trade off the amount of complexity it allows for encoding and decoding. For example, if the terminal 110A is going to initiate a conference proposing only one codec type for the data (i.e., a mandatory codec) then it knows that it will not need more than one encoder instance and can use more of its processor resources for decoding. This may allow it to increase N as long as it knows that other terminals (e.g., terminals 110B and 110C) also have the necessary decoding capabilities for the selected codec. Alternatively, the terminal 110A may choose to propose more codec types as it only plans to initiate a small conference, with N equal to a small value.

In some multi-stream multiparty conferences, a terminal performs both audio and video coding. If these processes run on the same processors, then the MaxEnc and MaxDec may depend on how many instances of each operation for each data type are running. Conceptually, the limitation can be generalized as follows: Complexity [operational audio codecs+operational video codecs]<=Complexity Limit. That is, the complexity of the operational audio codecs plus the complexity of the operational video codecs should be less than or equal to the complexity limit for the terminal.

In one embodiment, a terminal can also trade off the amount of complexity it allows for encoding and decoding among the different data types. For example, if the terminal 110A is going to initiate a conference proposing only one codec type for the video (i.e., a mandatory video codec like H.264) then may know that it won't need more than one video encoder instance and can use more of its processor resources for decoding video and audio encoding/decoding. This may allow the terminal 110A to increase N or propose more speech codecs (e.g., EVS, AMR-WB, AMR) for the audio data type.

In some embodiments, a terminal can extend its ability to handle a conference with N users even if N>Min [MaxDec of each terminal]+1, as long as the terminal and all the other terminals in the conference do not decode all of the data streams they receive. This requires that the terminals have a means for choosing which data streams to prioritize and which ones to ignore based on certain parameters of the data streams. As described below, the parameters may comprise a transmission mode, a volume level, a complexity level, an activity level, a packet size, etc.

In an example embodiment, a terminal may inspect the multiple RTP streams received from the conference participants and/or a media gateway (e.g., terminal/media gateway 450 of FIGS. 4 and 5 discussed below). For example, depending on the RTP packet length and the participant ID, the terminal may distinguish between an active speech (typically coded at a higher bit rate, e.g., 13.2 kb/s) and an inactive/background portions (typically coded using discontinuous transmission (DTX) e.g., 2.4 kb/s); and participant ID 2 or 3 or . . . (N−1). The terminal may track at each RTP packet instance, the active speakers among the list of participants. The active speaker information may be stored and analysed for selecting the priority of which of the recent active participant RTP streams can be decoded and which of the non-active streams are not sent for decoding.

Prioritization Based on Past Active Speaker

In the case of speech, this selection could be made based on which data streams are or are not in a certain mode (e.g., DTX mode). In most cases, talkers may naturally floor or yield control to each other as it is difficult to listen to more than two speakers at the same time. Therefore, a terminal that can decode up to two or three concurrent data streams could handle most audio conference configurations. However, it should be noted that there will still be some operational complexity increase with increasing N as the terminal has to inspect the voice packets (at least for size) from the data streams to determine which are active.

Prioritization Based on RTP Level Limitation

In another embodiment, a terminal (terminal 110A) can search through the data streams it is receiving and choose to mix (prioritize) the first MaxDec data streams that are active. After finding MaxDec active data streams, it stops searching through the others, thus saving some computational complexity.

It is also possible for the terminal 110A to attempt to prioritize the data streams with the loudest volumes. This prioritization may require decoding of the data from each data stream to determine the loudest MaxDec data streams. The terminal 110A could save some complexity if the sampling/selecting is not performed for every voice frame, e.g., periodically at longer intervals.

For video, it may not be as simple to dynamically select which data streams to prioritize and ignore as there are not the same concepts of modes (e.g., DTX mode) and volume. Looking at other criteria, such as the amount of movement, may involve significant complexity. Other criteria, such as looking at the size of data packets, might be used to get an idea of motion/new information in particular data streams.

Video may also have the additional challenge that most of the frames in the data streams are differentially encoded with respect to previous video frames in the data stream. If a data stream is ignored, it cannot simply be decoded again until an independently-decodable (e.g., IDR) frame, or a frame whose reference frame has already been pre-stored, is received. In one embodiment, selection of the data stream to decode can be based on the corresponding audio packet length. For example, if the audio associated with a video packet is DTXed (small packet size), then the terminal 110A may determine to not decode the video and display the last frame (freeze picture). Then, based on the last three active talkers, the receiver (e.g., terminal 110A) can prioritize which data streams to decode. When the receiver receives a video IDR frame in a given data stream, it can select to decode that frame, display it, and/or keep it as a reference frame. If there is not much motion then an IDR frame may be received less frequently and it may be sufficient to display the IDR frame. In some aspects, if the conference participant does not talk (not active talker) but moves a lot, then the receiver (e.g., terminal 110A) can fall back on using the audio packet length to decode the video.

In some aspects, communication over a decentralized architecture such as the decentralized architectures 200 and 300 of FIGS. 2 and 3 may cause increased processing during a terminal's uplink transmission. For example as shown in FIGS. 2 and 3, each time terminal 110A transmits a data stream, it must transmit a copy of the data stream to each of terminals 110B and 110C which may require a large amount of resources. In some embodiments, it may be beneficial to utilize a multicast conference architecture to address some of the increased demands on the uplink transmissions in a multi-unicast architecture.

In some embodiments, some or all of the decoding capabilities described above with respect to a decentralized conference architecture may be applied to a centralized or hybrid conference architecture. Referring back to FIG. 1, the centralized processor 125 may receive data streams from each of the terminals 110A-D, decode, mix and transmit the mixed data stream to the terminals 110A-D. In other aspects, the centralized processor 125 may receive data streams from each of the terminals 110A-D, decode, mix and transmit the data stream to some terminals and may send multiple data streams to other terminals. In some aspects where one or more of the terminals 110A-D receive multiple data streams, the terminals 110A-D receiving multiple data streams may rely on the parameters described above to ignore, select, or prioritize which data streams to decode. For example, as shown in FIG. 1, terminals 110A-D may send data streams to the centralized processor 125. The centralized processor 125 may then decode and mix the received data into a mixed data stream and transmit the mixed data stream to the terminals 110A-C. The centralized processor 125 may also transmit multiple data streams to terminal 110D (e.g., the three data streams from terminals 110A-C).

In some aspects, terminal 110D and/or the centralized processor 125 may be limited in the number of data streams they may concurrently process or encode/decode. In the example described above with reference to FIG. 1, terminal 110D may receive the three data streams from terminals 110A-C but may only be capable of decoding two data streams. Similarly, the centralized processor 125 may receive four data streams (e.g., one from each of the terminals 110A-D) but may only be capable of decoding three data streams. Accordingly, terminal 110D and/or the centralized processor 125 may prioritize, select, and/or ignore certain data streams based on certain parameters. For example, terminal 110D and/or the centralized processor 125 may prioritize received data streams to decode the two or three loudest volume data streams and ignore the lowest volume data stream.

Additionally, as discussed with respect to the decentralized architecture of FIGS. 2 and 3, the terminal 110 initiating the conference (e.g., terminal 110A) should consider the encoding/decoding limitations of the other terminals 110 participating in the conference (i.e., terminals 110B-D) along with the centralized processor 125 encoding/decoding limitations. For example, the initiator terminal 110A may consider one or more of the above limitations for the number of participants in a conference, for example: N<=Min [Max- Dec of each terminal/centralized processor]+1; Min [# of types of codecs in the offer, (N−1)]<=Min [MaxEnc of each terminal/centralized processor]; for a codec being offered, Min [MaxEnc of each codec] and Min [MaxDec of each coded]; Complexity [operational encoders+operational decoders]<=Complexity Limit; and/or Complexity [operational audio codecs+operational video codecs]<=Complexity Limit.

Figure 4:
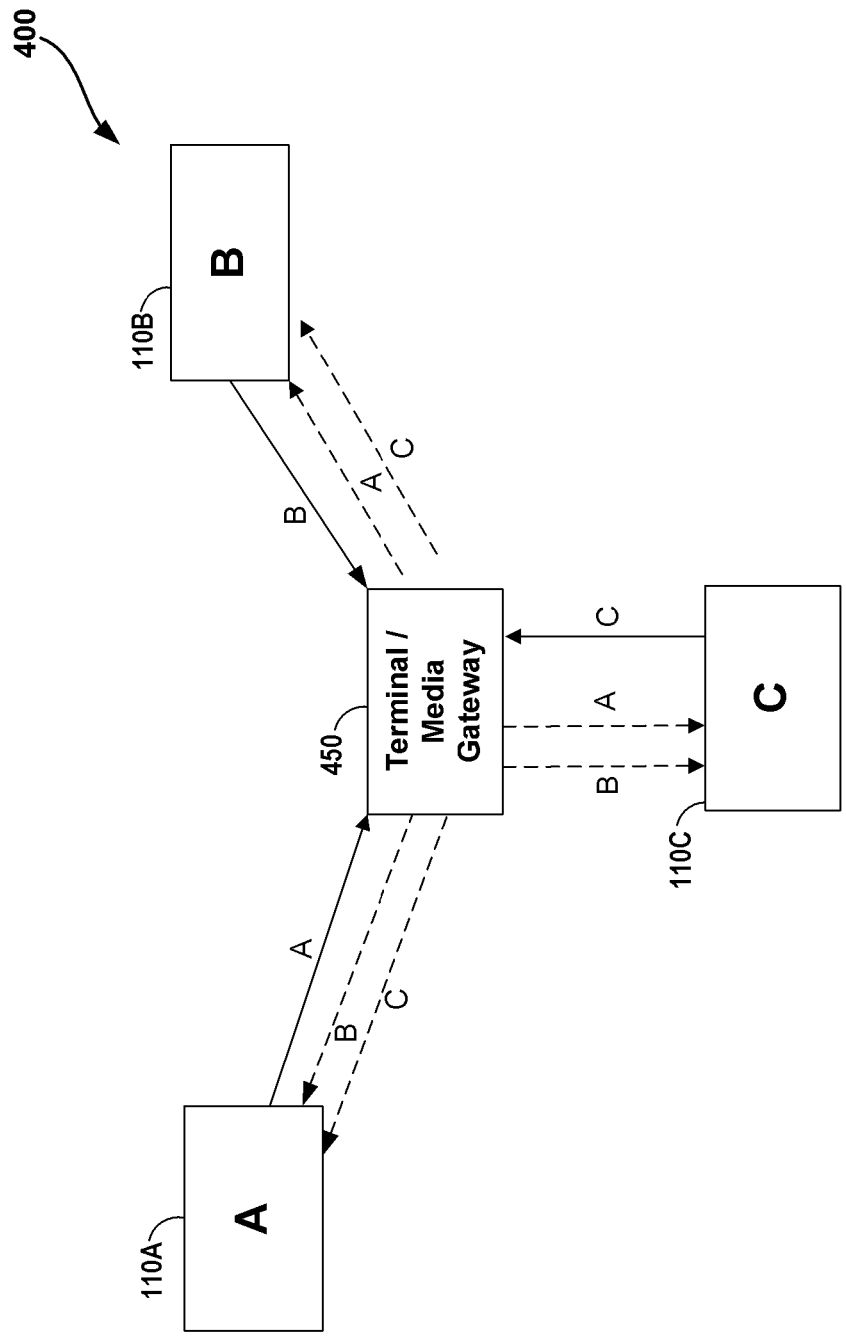
FIG. 4 illustrates an example of a hybrid conference architecture for multiple participants where a terminal functions as a mixer.

FIG. 4 is a diagram of an exemplary hybrid conference architecture 400 for multiple participants where a terminal/media gateway 450 functions as a mixer. As shown in FIG. 4, terminals 110A-C may each send a data stream to the terminal/media gateway 450 which then sends multiple data streams to the terminals 110A-C. For example, terminal/media gateway 450 may receive data streams from terminals 110B and 110C, decode and send those data streams to terminal 110A. In some aspects, terminal/media gateway 450 may mix the data streams from terminals 110B and 110C and send a mixed data stream to terminal 110A.

In one implementation, terminal 110A may adjust the number of data streams it receives from the terminal/media gateway 450 based on certain limitations or conference parameters. For example, terminal 110A may utilize the terminal/media gateway 450 (or centralized processor 125 of FIG. 1) processing capabilities to reduce or off-load its own processing or ensure efficient communication within the conference architecture (either centralized, decentralized, or hybrid) limitations. In one aspect, the terminal 110A may request the terminal/media gateway 450 to only send one mixed data stream because the terminal 110A may only be capable of decoding one data stream or because the terminal 110A has limited processing power.

Additionally, it may be possible for terminals 110A-D, the centralized processor 125, and/or the terminal/media gateway 450 in FIGS. 1-4 (and FIG. 5 below) to switch capabilities. For example, the terminals 110A-D and the centralized processor 125 may be operating in the conference architecture 100 of FIG. 1 and the centralized processor 125 may lose power or lose mixing capabilities. In some aspects, the terminal 110D may switch from operating as a conference participant into operating as the non-participating terminal/media gateway 450 of FIG. 4, essentially replacing the centralized processor 125 functions. Additionally, the terminal/media gateway 450 of FIG. 4 may also operate as a participating terminal/media gateway 450 in the conference by sending its own data streams to one or more participants in the conference (e.g., terminals 110A-D). Accordingly, each of the terminals 110A-D, the centralized processor 125, and/or the terminal/media gateway 450 may be configured to operate in one or more of the centralized conference architecture 100 of FIG. 1, the decentralized conference architectures 200 and 300 of FIGS. 2 and 3, and the hybrid conference architecture 400 of FIG. 4.

In one example, a conference (e.g., conference architectures 100, 200, 300, 400, and 500 [discussed below]) may have a conference duration that comprises a first duration and a second duration. In some aspects, during the first duration terminal 110D may operate as a conference participant as illustrated in FIG. 1. In some aspects, during the second duration, the terminal 110D may switch to operating as the terminal/media gateway 450 as depicted in FIG. 4 (and FIG. 5 below). In some aspects, the terminal 110D may request to switch operating functions to the centralized processor 125, to one or more of the terminals 110A-C (as illustrated in FIG. 1), or to another controller or device. In other aspects, the centralized processor 125 or one or more of the terminals 110A-C (as illustrated in FIG. 1) may determine that terminal 110D is capable of switching to operating as the terminal/media gateway 450.

In some aspects, a conference initiation or association may occur during the first duration and an exchange of conference data may occur during the second duration. For example, with respect to FIGS. 2 and 3 the terminal 110A, during the first duration, may transmit a first or offer message to terminals 110B and 110C including a list of codec capabilities supported by terminal 110A. The terminal 110A may receive a response message from each of the terminals 110B and 110C. The second or response message may include a list of codec capabilities of the respective terminal 110B or 110C and a codec type selected by the terminals 110B and 110C. The terminal 110A may determine whether each of the terminals 110B and 110C can participate in the conference based on the list of codec capabilities in each of the second or response messages. During the second duration, the terminals 110A-C may exchange data streams amongst each other.

In some aspects, the centralized processor 125 or one or more of the terminals 110A-C may request that the terminal 110D switch to operating as the terminal/media gateway 450. In some embodiments, the request may be based on the terminal 110D's encoding/decoding capabilities and/or based on the centralized processor 125 or one or more of the terminals 110A-C encoding/decoding capabilities. For example, the terminal 110A may determine that it can only receive two data streams and may request the terminal 110D to switch operations. The request may include requesting that the terminal 110D process and mix communications from terminals 110B and 110C and that terminal 110D send the mixed data stream to terminal 110A. In some aspects, the request may be transmitted to terminals 110B and 110C from one of terminal 110A, 110D, or the centralized processor 125 indicating that the new conference identifier or conference uniform resource identifier (URI) for terminals 110B and 110C is an address for terminal 110D. In some aspects, the request or the indication of the new destination (i.e., terminal 110D) for processing and mixing data streams for terminals 110B and 110C may be sent via an out of band communication. In response to the request, terminals 110B and 110C may then switch from sending data streams to the centralized processor 125 to sending data streams to the terminal 110D. In order to reduce potential latency issues involved with the switch, terminals 110B and 110C may send data streams to both the centralized processor 125 and terminal 110D until a time where the centralized processor 125 and/or terminal 110D determine that the switch is complete.

Figure 5:
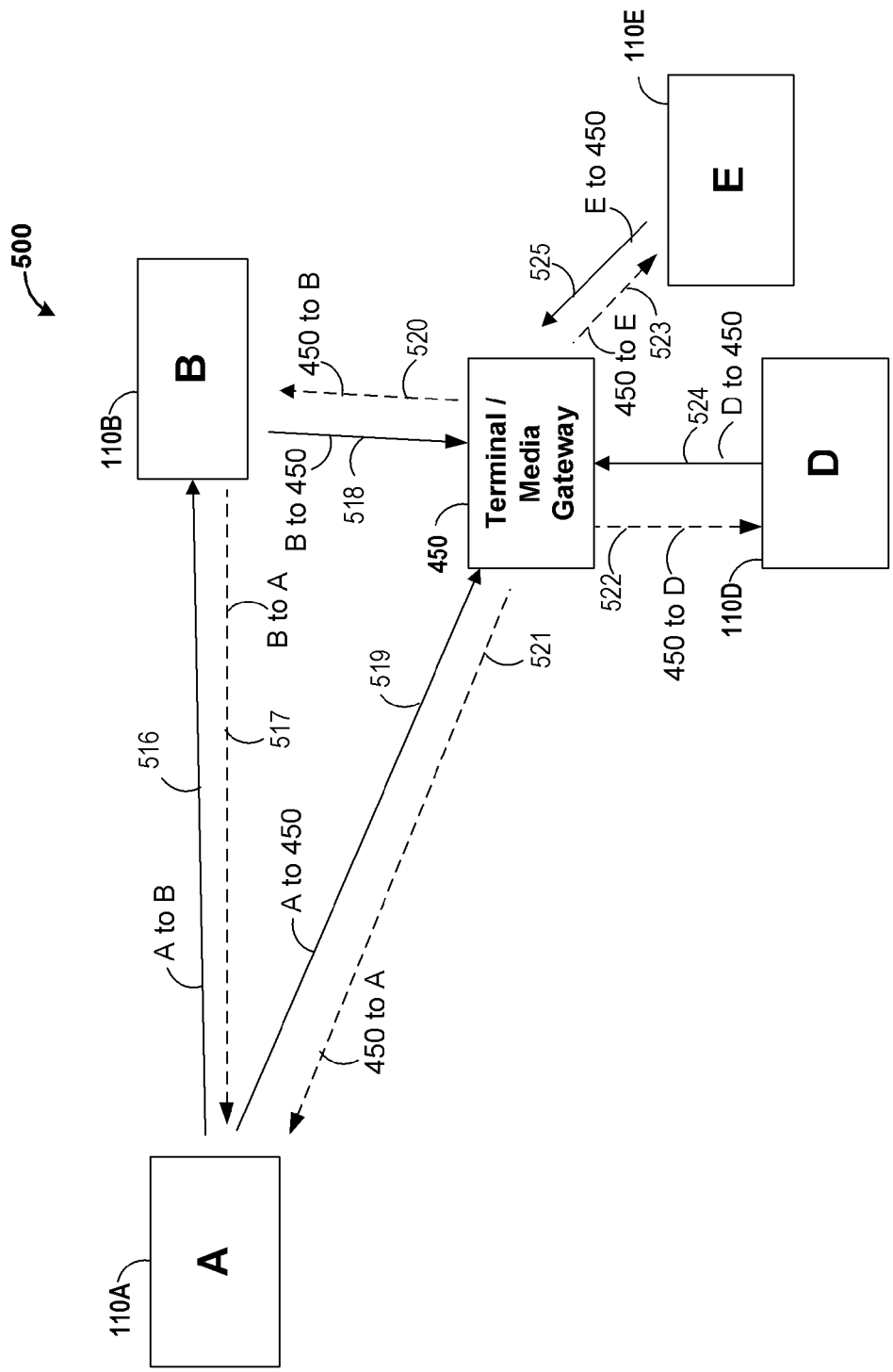
FIG. 5 illustrates an example of a hybrid conference architecture for multiple participants where a terminal functions as a mixer and participant.

FIG. 5 is a diagram of an exemplary hybrid conference architecture 500 for multiple participants where the terminal/media gateway 450 functions as a mixer and participant. As shown in FIG. 5, terminal 110A may initiate a conference with terminal 110B, terminal/media gateway 450, and terminals 110D-E as participants in the conference. Terminal 110A may initiate a conference by any method such that the participants (terminal 110B, terminal/media gateway 450, and terminals 110D-E) join the conference. For example, the terminal 110A may initiate the conference using an out of band communication with the participants (e.g., email communication indicating the conference and/or a conference bridge). In some aspects, terminal 110A may also initiate the conference by employing the REFER method described above for terminal 110B and terminal/media gateway 450 in combination with an out of band communication to terminals 110D and 110E for those terminals to join the conference via the terminal/media gateway 450. In other aspects, the terminal 110A may initiate the conference through a poll message announcing a start of the conference and the terminals 110B and 110D-E and the terminal/media gateway 450 may transmit a message with their codec capabilities to join the conference. As described above, other methods to initiate the conference are also possible.

As discussed above with respect to FIGS. 1-4, terminal 110A may consider the encoding/decoding capabilities of each of the participants when initiating the conference. In FIG. 5, terminal 110A may transmit data stream 516 to terminal 110B, transmit data stream 519 to terminal/media gateway 450, and receive data streams 517 and 521 from terminal 110B and terminal/media gateway 450, respectively. Terminal 110B may also transmit data stream 518 to terminal/media gateway 450 and receive data stream 520 from terminal/media gateway 450. Terminal/media gateway 450 may also receive data streams 524 and 525 from terminals 110D and 110E, respectively, and transmit data streams 522 and 523 to terminals 110D and 110E, respectively. Each of the data streams 516-525 may comprise one or more audio and/or video (media) streams.

In some embodiments, terminal/media gateway 450 functions as both mixer and participant in a conference. For example, terminal/media gateway 450 may receive data stream 519 from terminal 110A, data stream 518 from terminal 110B, data stream 524 from terminal 110D, and data stream 525 from terminal 110E. In some aspects, terminals 110D and 110E may only be able to decode one data stream each while terminals 110A and 110B may each be able to decode three data streams. In some aspects, terminals 110A and 110B may be considered new or high efficiency terminals compared to terminals 110D and 110E. In some aspects, terminals 110D and 110E may be considered legacy or older devices than terminals 110A and 110B. In one embodiment, terminal/media gateway 450 may transmit a single mixed data stream 522 to terminal 110D and a single mixed data stream 523 to terminal 110E. In some aspects, the terminal/media gateway 450 may transmit a multicast mixed data stream to terminals 110D and 110E while concurrently sending unicast data streams 521 and 520 to terminals 110A and 110B. Additionally, terminal/media gateway 450 may transmit data stream 521 to terminal 110A which may comprise a data stream from terminal 110B, a data stream from terminal/media gateway 450, and a mixed data stream from terminals 110D and 110E.

In other aspects, terminal/media gateway 450 may transmit other combinations of data streams from the other participants in the conference. For example, terminal/media gateway 450 may ignore the data stream from terminal 110E and transmit only the data streams from terminals 110B, 110D, and terminal/media gateway 450 to terminal 110A. Terminal/media gateway 450 (and any of the terminals 110A, 110B, 110D, and 110E) may prioritize, select, and/or ignore certain data streams in accordance with any of the implementations or combinations described herein. In another example embodiment, the terminal/media gateway 450 may receive data streams from terminals and identify the streams that are active speech (e.g., 110B, 110C) and that are background/inactive speech (e.g., 110D, 110E). The terminal/media gateway 450 may choose to decode and mix the DTX/inactive frames and transmit as one inactive frame along with the multiple active frames (e.g., to terminal 110A). In a multi-party conference with large number of participants (e.g., N>10), the above discussed selective pre-parsing and mixing of DTX/inactive frames at the terminal/gateway 450 may reduce the number of multiple streams received at a terminal for processing. The receiving terminal (e.g., 110A) may now have fewer streams to inspect and prioritize for decoding. In another example embodiment, the terminal/media gateway 450 may determine the the corresponding video streams associated with the DTX/inactive frames and perform tiling/re-encoding of those video/image data streams into one video stream, thereby reducing the number of multiple video streams received at a terminal for processing.

As discussed above with respect to FIG. 4, in some aspects, any of the terminals 110A, 110B, 110D, 110E and the terminal/media gateway 450 of FIG. 5 may switch operating functions in a variety of ways. For example, terminal 110B and the terminal/media gateway 450 may determine (e.g., via out of band communication or through analysis of codec capabilities) to transfer mixing operations of the terminal/media gateway 450 to terminal 110B. In some aspects, the terminal/media gateway 450 and/or the terminal 110B may broadcast to the other conference participants either directly or indirectly (e.g., out of band or through another terminal) that terminal 110B is taking over the processing and mixing operations of the terminal/media gateway 450. While terminal 110B is discussed as taking over the processing operations of the terminal/media gateway 450, in other embodiments, any of the terminals 110A, 110D, or 110E, or another device, may similarly replace the terminal/media gateway 450's processing and/or mixing operations.

In other embodiments, the terminal/media gateway 450 may utilize the REFER method to broadcast to the other conference participants to transfer the conference data streams that the conference participant is sending to the terminal/media gateway 450 to now send the conference data streams to terminal 110B. In addition, the conference participants may send their respective data streams to both the terminal/media gateway 450 and terminal 110B for a period of time until all conference participants are transmitting their data streams to terminal 110B. Similarly, the terminal/media gateway 450 and terminal 110B may for a period of time both concurrently process and mix multiple data streams they receive from the other conference participants until the terminal/media gateway 450 and/or terminal 110B have determined that all terminals have switched over in order to reduce potential interruption or latency issues.

Figure 6:
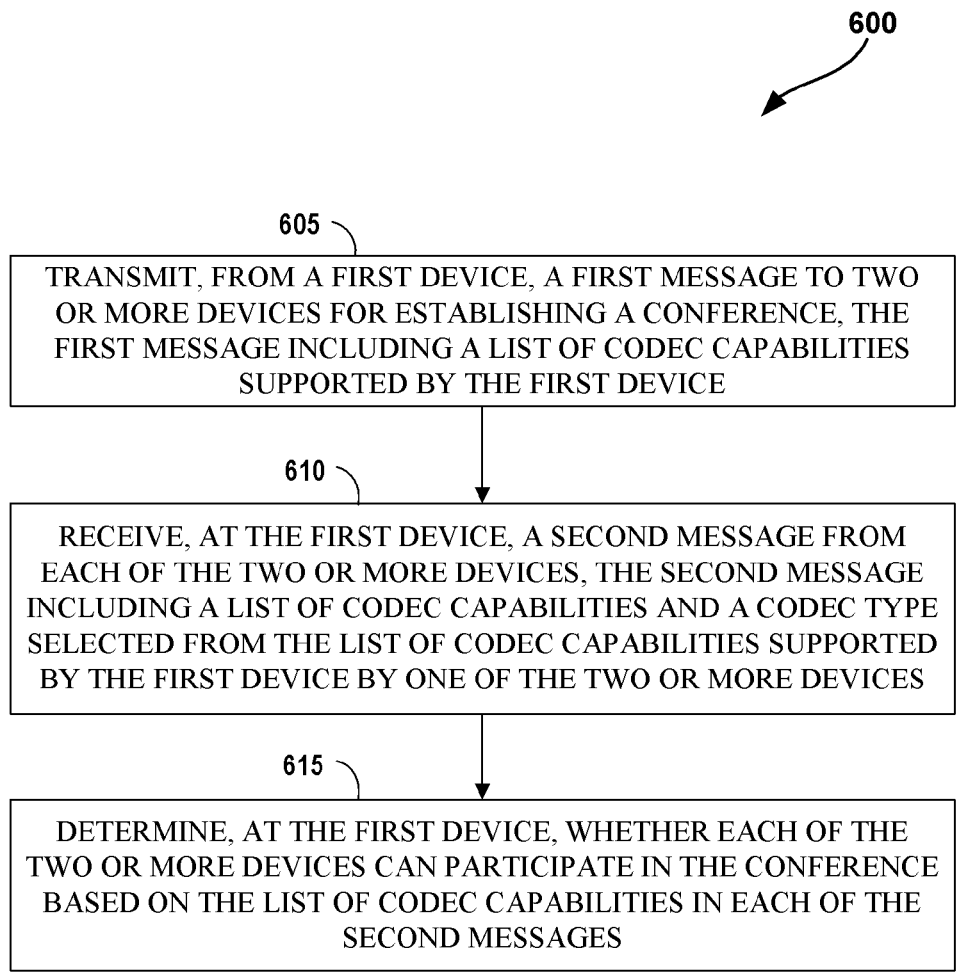
FIG. 6 is a flowchart of an exemplary method for codec negotiation in a decentralized conference.

FIG. 6 is a flowchart of an exemplary method 600 of codec negotiation in a decentralized multimedia conference. The method 600 shown in FIG. 6 may be implemented via one or more devices in the conference architecture 200 and/or 300. In some aspects, the method may be implemented by a device similar to the user terminals 110A-D of FIGS. 1-3, or any other suitable device.

At block 605 an initiator terminal (terminal 110A) may transmit a first or offer message to two or more devices for establishing a conference. The first message may include a list of codec capabilities supported by the initiator terminal. In some embodiments, the first message may also be based on the codec capabilities of the other participants for which their concurrent capabilities are known beforehand (terminals 110B and 110C).

At block 610, the initiator terminal receives a second or response message from each of the two or more devices. The second message includes a list of codec capabilities supported by the transmitting device of the two or more devices and a codec type selected from the list of codec capabilities supported by the first device by one of the two or more devices. The codec capabilities information included in the first message and/or the second message may indicate the capabilities per codec, independently indicate capabilities for the encoder and decoder of each codec, indicate whether concurrent operation of an encoder and/or decoder of different codecs share the same computational resource, and/or indicate that the terminal decoding capabilities do not pose a constraint because the terminal is able to intelligently trim or reduce (e.g., through prioritizing certain data streams as discussed above) the number of data streams to match its concurrent decoding capabilities.

One example that meets the above format requirements for the codec capabilities information is to describe the percentage of processor resources available or allocated for each encoding/decoding function. This allows the initiator terminal to mix and match codecs, including those of different data types, along with their encoders and decoders as long as it keeps the total complexity load no larger than 100% of the allocated resources in a given processor. One way to describe the above information may be to introduce two new codec-level SDP attributes:

a=enc_use: percent, proc_num
a=dec_use: percent, proc_num where "percent" ranges from 0 to 1.0 and describes the resource allocation factor of processor "proc_num" that is available for the encoding/decoding function. The information can be conceptualized as follows in Table 1:

TABLE 1

| Data Type | Codec Name | Resource allocation factor for encoder | Resource allocation factor for decoder | proc_num |
|---|---|---|---|---|
| Audio | AMR-NB | 0.1 | 0.02 | 1 |
| Audio | AMR-WB | 0.2 | 0.04 | 1 |
| Audio | EVS | 0.5 | 0.1 | 2 |
| Video | AVC/H.264 | 0.6 | 0.15 | 1 |
| Video | HEVC/H.265 | 0.9 | 0.23 | 2 |

As noted above with reference to FIGS. 1-5, a receiving terminal or device (e.g., terminal 110B, terminal/media gateway 450, etc.) can prioritize and ignore particular data streams to reduce the number decoder instances it has to concurrently operate/decode. If a terminal employs such a "trimming" algorithm and is able to limit the number of data streams it has to decode to match its concurrent decoding capabilities, then the terminal does not require the conference initiator to limit the number of participants in the call based on the terminal's decoding capabilities. In this case the terminal can indicate a processor resource allocation factor of 0 corresponding to such streams as illustrated in the following example of Table 2:

TABLE 2

| Data Type | Codec Name | Resource allocation factor for encoder | Resource allocation factor for decoder | proc_num |
|---|---|---|---|---|
| Audio | AMR-NB | 0.1 | 0 | 1 |
| Audio | AMR-WB | 0.2 | 0 | 1 |
| Audio | EVS | 0.5 | 0 | 1 |
| Video | AVC/H.264 | 0.6 | 0.15 | 2 |
| Video | HEVC/H.265 | 0.9 | 0.23 | 2 |

The ability to support the concurrent decoding of many data streams makes it likely that decoding may not be the limiting factor in setting the size of a conference. The number of real-time transport protocol (RTP) data streams that can be handled by the terminal's protocol stack becomes the limiting factor. Therefore it may be beneficial to also communicate this information. Furthermore, two new session-level SDP attributes can be defined to specify the limits on the number of concurrent RTP stacks:

a=rtp_tx_limit: rtp_instances
a=rtp_rx_limit: rtp_instances where "rtp_instances" indicates the number of concurrent RTP instances supported. In some aspects, conference initiator terminal (e.g., terminal 110A of FIGS. 2-5) uses the above information from each participant in the conference to ensure that the proposed conference does not exceed either the codec or RTP processing capabilities of the participants.

At block 615, the initiator terminal may determine whether all of the two or more devices can participate (or continue to participate) in the conference based on the list of codec capabilities (i.e., the constraints described in the previous sections are all met). In some aspects, if the initiator sees no issues it allows the conference to be established as negotiated and stores all the information received in individual profiles for each of the terminals. In other aspects, if the initiator sees an issue, it can attempt to remedy the problem by sending a new message (e.g., SIP Re-INVITE/UPDATE message) with a viable offer (constructed based on all the received concurrent codec capabilities of the participants) to some, or all, of the participants.

In some embodiments, the initiator terminal may send a first or offer message based on its concurrent codec capabilities and those of other participants for which their concurrent capabilities are known beforehand. After receiving the first message, each participant's terminal may examine the first message to determine N and the maximum number of codecs that are offered to determine if it can meet the constraints described in the previous sections. If the terminal can participate, it may respond with a selected codec.

Figure 7:
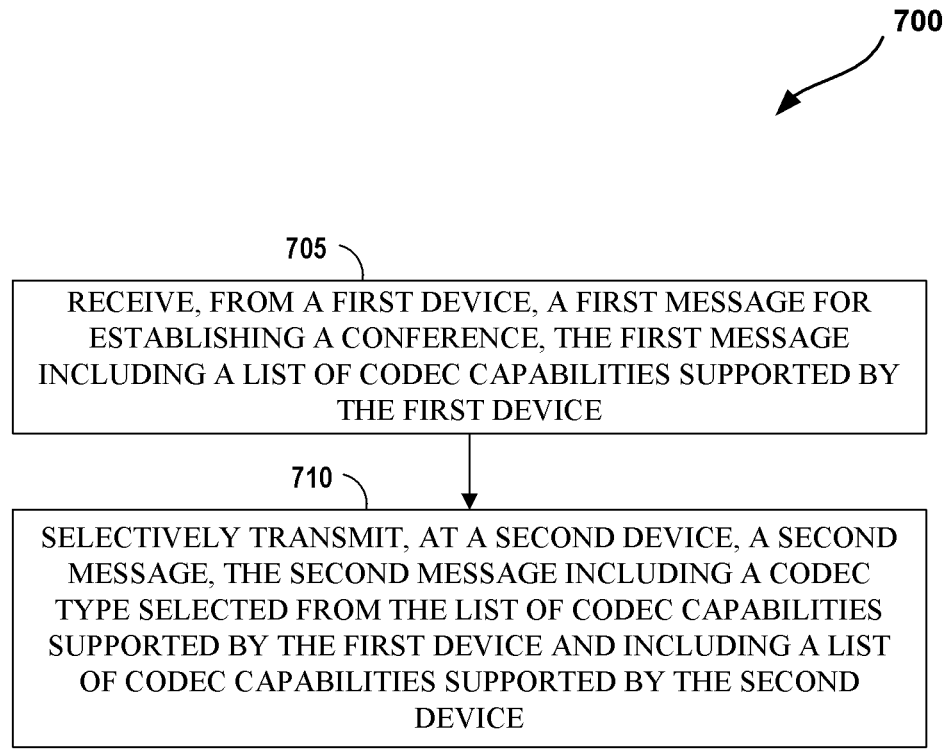
FIG. 7 is a flowchart of another exemplary method for codec negotiation in a decentralized conference.

FIG. 7 is a flowchart of an exemplary method 700 of codec negotiation in a decentralized multimedia conference. The method 700 shown in FIG. 7 may be implemented via one or more devices in the conference architecture 200 and/or 300. In some aspects, the method may be implemented by a device similar to the user terminals 110A-D of FIGS. 1-3, or any other suitable device.

At block 705 a terminal (terminal 110B) may receive, from a first device, a first or offer message for establishing a conference. The first message may include a list of codec capabilities supported by the first device. In some aspects, the first message may be based on the initiator terminal's concurrent codec capabilities. In some embodiments, the first message may also be based on the codec capabilities of the other participants for which their concurrent capabilities are known beforehand (terminals 110B and 110C).

At block 710, the terminal selectively transmits a second or response message, the second message including a codec type selected from the list of codec capabilities supported by the first device and including a list of codec capabilities supported by the terminal. In some aspects, after receiving the first message, the terminal may process the first message to determine the number of participants and the maximum number of codecs that are offered to determine if it can meet the constraints described herein. If the terminal can participate, it may respond with a second message including a selected codec from the list of codec capabilities supported by the first device and a list of its own codec capabilities. If the terminal determines it cannot participate it may not respond with a second message.

In another embodiment, the other participating terminals (e.g., terminals 110B and 110C) can also include their concurrent codec capabilities in the second message. This allows the initiator terminal to store and guarantee that the terminal's capabilities are properly considered for any future conferences initiated by the same initiator terminal. In some aspects, the initiator terminal may store the capabilities in a database.

If the participating terminal determines it cannot participate it indicates this in the second message and sends its concurrent codec capabilities. The initiator terminal may then process the second messages from the other participating terminals as follows: (1) if the initiator terminal receives no negative responses it allows the conference to continue; (2) if the initiator terminal receives a negative response then it uses all received concurrent codec capabilities to construct an new offer message and transmits this in a new third message (e.g., SIP Re-INVITE/UPDATE message) to some, or all, of the participants.

In some embodiments, each terminal may store a concurrent codec capabilities profile for each of terminals in its address book or a database. This profile can include the MaxEnc and MaxDec for each data type of each terminal. In other aspects, this profile can include a list of the terminals' codecs for all data types along with resource allocation factor or the percentage of processor complexity used by each instance of the codec. For example, Table 3 below illustrates an exemplary list of the terminals' codecs for all data types along with percentage of processor complexity used by each instance of the codec.

TABLE 3

| Data Type | Codec Name | Encoder Complexity | Decoder Complexity |
|---|---|---|---|
| Audio | AMR-NB | 10% | 2% |
| Audio | AMR-WB | 20% | 4% |
| Audio | EVS | 60% | 20% |
| Video | H.264/AVC | 60% | 15% |
| Video | H.265/HEVC | 90% | 23% |

In some aspects, the initiator terminal can then use the above profile of each of the participants to determine a first or offer message that can be met by each participant using the constraint considerations described herein.

In communicating their concurrent codec capabilities, terminals can also indicate that they can handle reception of more data streams because they are able to prioritize and ignore data streams of a particular data type. For example, the terminal 110A may indicate that it can concurrently decode up to three EVS data streams (each using 20% of its processor) after which it will ignore any additional data streams received.

In some aspects, terminals can also exchange concurrent codec capabilities information before a conference is initiated to better guarantee that a viable offer message is included in the first initiation messages (e.g, the first SIP INVITE). This exchange of concurrent codec capabilities information can be performed as follows: when a user adds another user to their address book or directory on the terminal, the address book applications contact each other to exchange concurrent codec capabilities as well as any other personal information (home address, etc. . . . ) or when the codec capabilities of a terminal change (via download or swapping of terminal hardware). This exchange of information/profiles could be performed using whatever contact information identifier (ID) is provided between the users. For example: via an embedded profile multipurpose internet mail extensions (MIME) type in an email exchange if the ID is an email address; via an extensible markup language (XML) schema sent over a short message service (SMS) if the ID is the phone number; via an XML schema sent over some other messaging protocol. The profile information can be updated in a variety of ways. For example, the users make a call to each other or via the protocols described earlier for establishing conferences with in-terminal mixing, i.e., concurrent codec capabilities can be sent in the response. In another example, the terminal storing the profile may set a timer to autonomously and periodically (e.g., every month) check back with the other user's terminal to see if the capabilities have changed. These capabilities might change because of a software update or download by the user, or changing their handset. In some aspects, the terminal that has provided a profile may update all the users in its address book whenever its own capabilities have changed. Alternatively, two or more participants in a conference (who are not initiators) can exchange their concurrent codec capabilities when setting up the data session between themselves.

In some aspects, the OPTIONS request can be used to query the codec capabilities of another terminal by asking the terminal to send a copy of the session description protocol (SDP) it would offer describing its codec capabilities. This SDP will contain the concurrent codec capabilities information as described above. The OPTIONS request can be made well in-advance of a conference call and the SDP response may be stored in a profile for the queried terminal. In some embodiments, immediately before setting up a conference, the conference initiator could query the codec capabilities of all the terminals it plans to invite for which it does not have the information pre-stored.

Figure 8:
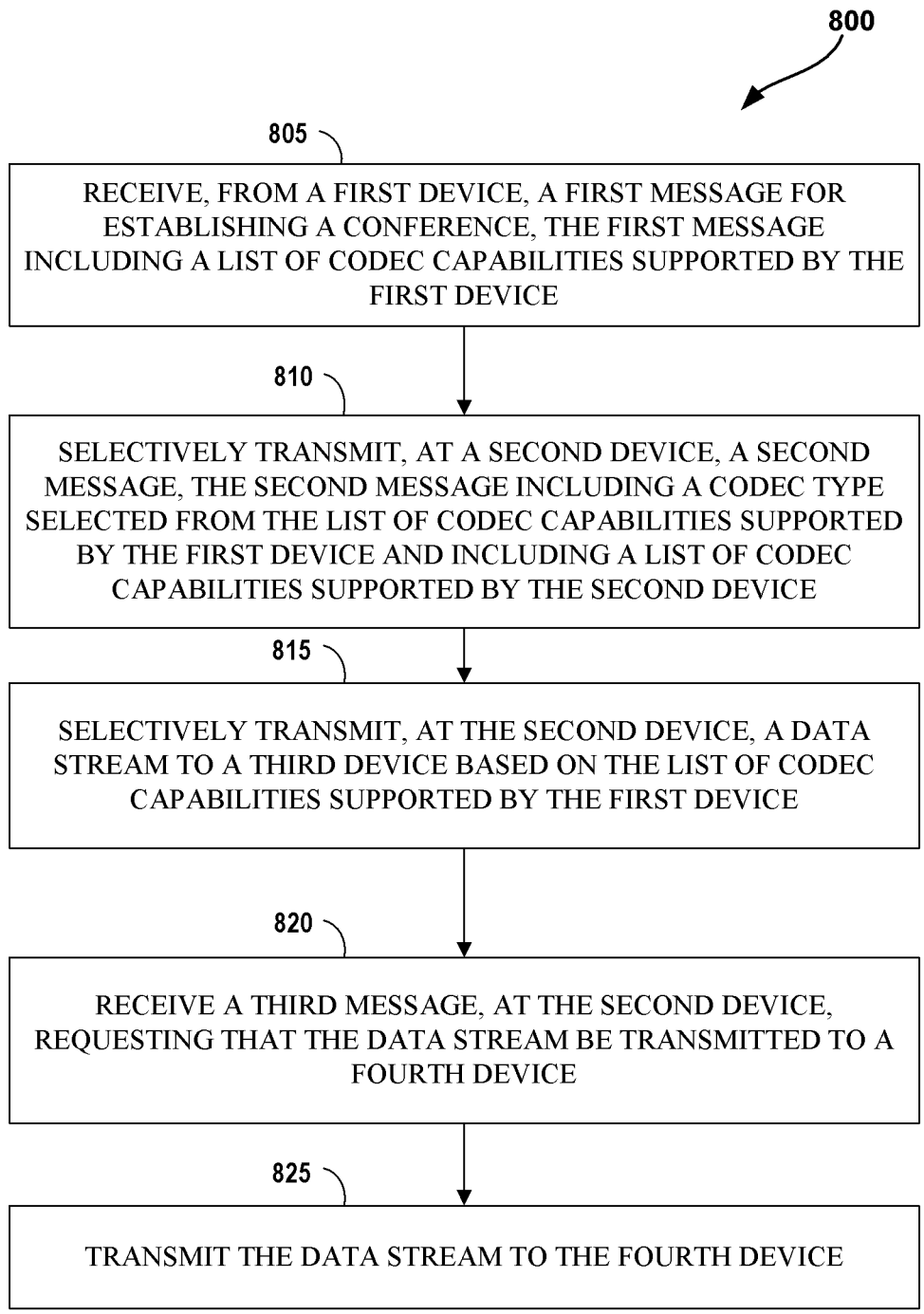
FIG. 8 is a flowchart of an exemplary method for codec negotiation in a conference.

FIG. 8 is a flowchart of an exemplary method 800 of codec negotiation in a multimedia conference. The method 800 shown in FIG. 8 may be implemented via one or more devices in the conference architectures 100, 200, 300, 400, and 500 in FIGS. 1-5. In some aspects, the method 800 may be implemented by a device similar to the user terminals 110A-D, the centralized processor 125, and/or the terminal/media gateway 450 of FIGS. 1-5, or any other suitable device.

At block 805 a terminal (e.g., terminal/media gateway 450 of FIG. 5) may receive, from a first device, a first or offer message for establishing a conference. The first message may include a list of codec capabilities supported by the first device.

At block 810, the terminal selectively transmits a second message. The second message may include a codec type selected from the list of codec capabilities supported by the first device and including a list of codec capabilities supported by the second device.

At block 815, the terminal selectively transmits a data stream to a third device based on the list of codec capabilities supported by the first device. At block 820, the terminal receives a third message requesting that the data stream be transmitted to a fourth device. At block 825, the terminal transmits the data stream to the fourth device.

Figure 9:
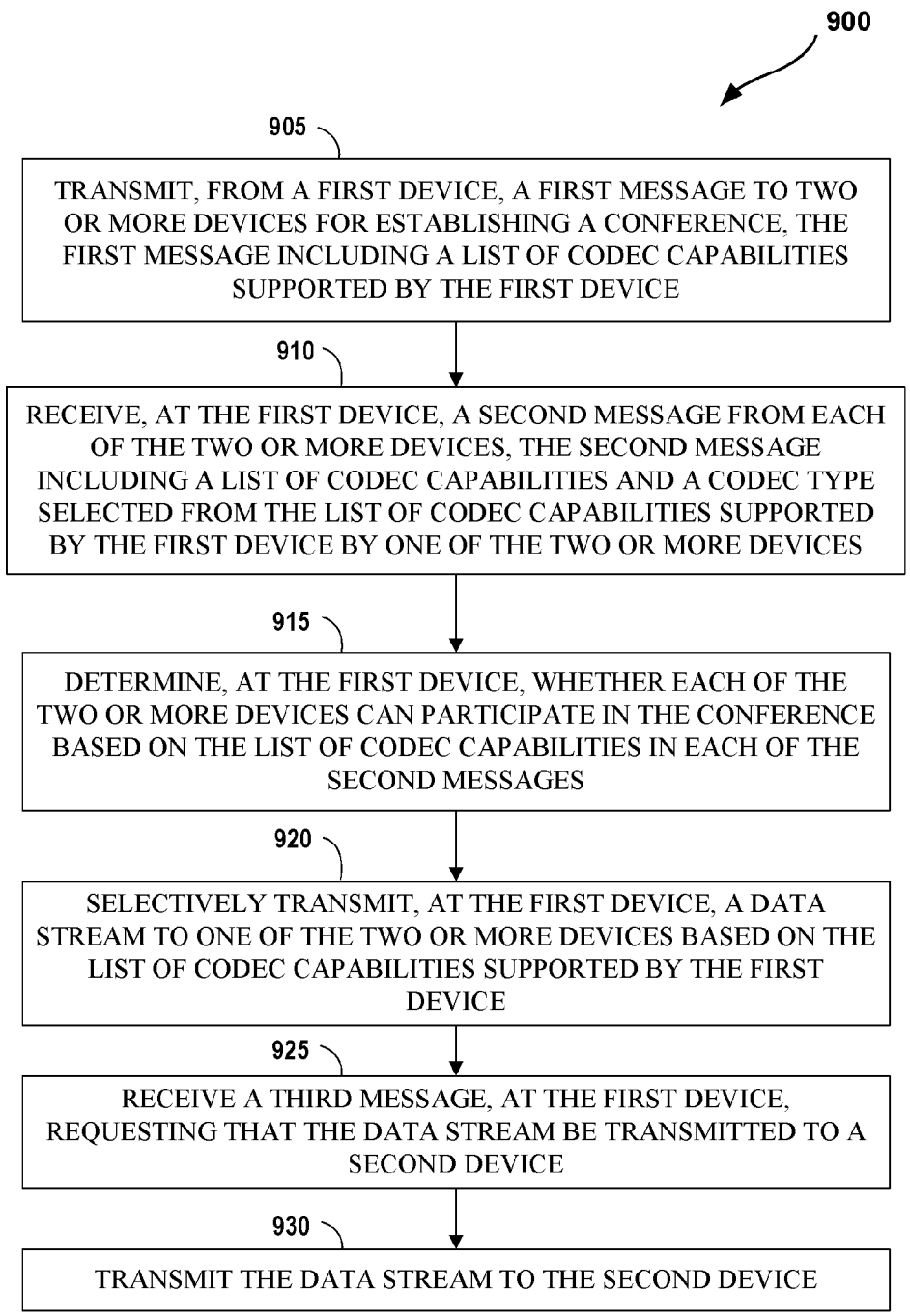
FIG. 9 is a flowchart of another exemplary method for codec negotiation in a conference.

FIG. 9 is a flowchart of an exemplary method 900 of codec negotiation in a multimedia conference. The method 900 shown in FIG. 9 may be implemented via one or more devices in the conference architectures 100, 200, 300, 400, and 500 in FIGS. 1-5. In some aspects, the method 800 may be implemented by a device similar to the user terminals 110A-D, the centralized processor 125, and/or the terminal/media gateway 450 of FIGS. 1-5, or any other suitable device.

At block 905 a terminal (e.g., terminal 110A of FIG. 5) may transmit a first or offer message to two or more devices for establishing a conference. The first message may include a list of codec capabilities supported by the terminal.

At block 910, the terminal receives a second message from each of the two or more devices, the second message including a list of codec capabilities and a codec type selected from the list of codec capabilities supported by the first device by one of the two or more devices. In some aspects, the list of codec capabilities in the second message comprises a list of codec capabilities supported by a first of the two or more devices transmitting the second message.

At block 915, the terminal determines whether each of the two or more devices can participate in the conference based on the list of codec capabilities in each of the second messages. At block 920, the terminal selectively transmits a data stream to a second of the two or more devices based on the list of codec capabilities supported by the first device. At block 925, the terminal receives a third message requesting that the data stream be transmitted to a second device. At block 930, the terminal transmits the data stream to the second device.

In a multicast conference architecture, each participant joins a common multicast group, and each participant sends a single copy of its data stream to that group. The underlying multicast infrastructure (e.g., network routers and switches) then distributes the data stream, so that each participant gets a copy. A non-limiting advantage of this multicast distribution model over multi-unicast (as shown in FIGS. 2 and 3) is that it does not require the sending terminal (e.g., terminals 110A) to send individual copies of the media to each of the other (N−1) participants (e.g., terminals 110B and 110C). This may provide savings on the uplink capacity or bandwidth, uplink coverage, and/or terminal battery life for conferences with large N participants.

In the multicast conference architecture, an initiator terminal (e.g., terminal 110A of FIGS. 2 and 3) may establish a conference data session using a variety of methods. For example, the initiator terminal (e.g., terminal 110A of FIGS. 2 and 3) may establish a conference data session in one or more of the centralized or decentralized architectures e.g., 100, 200, 300, 400, and 500 discussed above, as well as in other multicast, single source multicast, and multi-unicast scenarios. In some aspects, to establish a session without a central focus or the centralized processor 125 of FIG. 1, the initiator terminal 110A may invite the other participants (e.g., terminals 110B and 110C) to join a multicast group with a multicast IP address over which the data streams are to be delivered. Once all the participants join a multicast group, they can all transmit and receive data streams from that group using the multicast IP address. The initiator terminal 110A may select and assign the multicast IP groups (e.g., public or operator controlled private IP address) associated with the mandatory and optional codecs. If the initiator terminal 110A wishes to offer the use of multiple codecs for a particular data type then the initiator terminal 110A may establish a multicast group for each of the codecs to be used. Furthermore, at least one of these multicast groups may be assigned to a codec that is supported by all the terminals (i.e., a mandatory codec). This may ensure that all the invited participants (e.g., terminals 110B and 110C) will have at least one multicast group from which they can decode the data streams.

If a conference focus or the centralized processor 125 (or 1325 described below) was involved in session establishment of a multicast conference session, the centralized processor 125 would convey the same information as the initiator terminal 110 described above, albeit with possibly different signaling methods. For example, the centralized processor 125 may initiate the dialog with N participants to set up a conference, but the session description associated with the dialog may allow data to be distributed via multicast to all the participants. The multicast IP addresses (public or private) associated with the multicast groups for each of the mandatory and optional codecs are selected and assigned by the centralized processor 125. In some aspects, the security considerations are handled by the centralized processor 125 through SIP authentication mechanisms.

In some aspects of the multicast conference architecture, the initiator terminal 110A may not get confirmation whether all the invited participants (e.g., terminals 110B and 110C) are ready to receive the data streams. In some embodiments, it may be possible to address this by having the other participants (e.g., terminals 110B and 110C) send back an acknowledgement that they are attached to the multicast group. For example, the terminals 110B and 110C may acknowledge by either sending a unicast message directly back to the initiator terminal 110A or sending a multicast message directly back to the initiator terminal 110A and everyone else in the multicast group.

In some embodiments, the other participants (who are not the conference initiator) do not know whether all the other participants are able to receive the data streams via the multicast group. If this needs to be known, the other participants (e.g., terminals 110B and 110C) can determine this in a variety of ways. For example it may determine which of terminals 110B and 110C are able to receive the data streams via the multicast group by either relying on the conference initiator terminal 110A to send data streams and/or verbally mention that everyone is "on the call" or having each participant that is attached to the multicast group send a "who is here?" request to the multicast group and then listen for the response from the other participants. In some aspects, the querying participant may not know whether all invited participants are present unless it receives an invitation list. However, the querying participant will at least know who is present and ready to receive the data streams. In some embodiments, the initiator terminal 110A may send the invitation list to the other conference participants (e.g., terminals 110B and 110C) either out of band or during conference setup.

In some aspects, some additional data (e.g., media) may be specified when using a multicast conference architecture. In some aspects, in the absence of a conference focus or centralized processor 125, if a terminal supports more than the mandatory codec(s) and wishes to receive data streams on an optional codec(s) then, as described above, it may register to receive the data streams in a multicast group carrying the optional codec and a multicast group carrying the mandatory codec. If more than one mandatory codec is offered by the conference initiator (e.g., terminal 110A) the other participants (e.g., terminals 110B and 110C) may register to receive the data streams using a variety of methods. For example, the terminals 110B and 110C may each register to listen to all the multicast groups carrying data streams from the mandatory codecs. In some aspects, when sending data streams, the terminals 110B and 110C may only encode data streams using one of the mandatory codecs and may only send these data streams over the corresponding multicast group.

In another example, the participant terminals 110B and 110C may only have to register for one multicast group carrying the data streams from one of the mandatory codecs. When sending data streams, the terminals 110B and 110C may encode the data streams using all of the mandatory codecs and send the data streams to their corresponding multicast groups. Encoding the data streams using all of the mandatory codecs may increase the encoding load for the sending terminal while decreasing the decoding load of the receiving terminals and may be less desirable than the first example above where the terminals 110B and 110C encode data streams using one of the mandatory codecs as encoding may be computationally more taxing than decoding.

In some aspects, since the data streams may always be sent on the mandatory multicast groups and all terminals will listen to these groups, no terminal may be required to send data streams using the optional codecs and their multicast groups. In some embodiments, even the conference initiator (e.g., terminal 110A) does not have to transmit data streams using the optional codecs for which it has established a multicast group. However, terminals 110A-C may still encode using optional codecs if they provide better quality.

Figure 10:
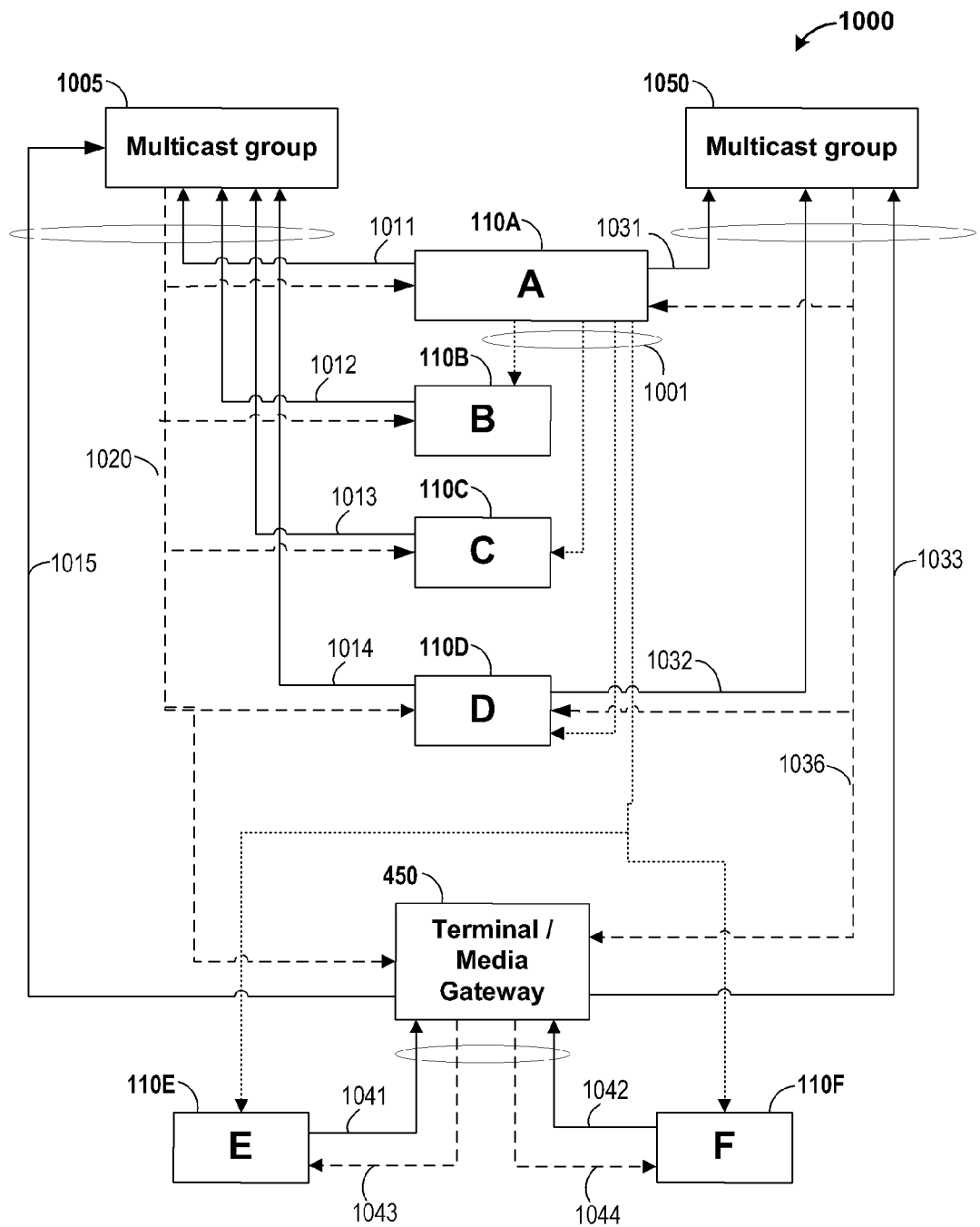
FIG. 10 is a diagram of an exemplary multicast architecture for multiple participants.

FIG. 10 is diagram of an exemplary multicast architecture 1000. The exemplary multicast architecture 1000 comprises terminals 110A-F and terminal/media gateway 450. FIG. 10 illustrates an exemplary conference session establishment and data stream exchange. As shown in FIG. 10, terminal 110A initiates the multicast conference by sending invite messages 1001 to each of terminals 110B-110F. In some aspects, the invite message may comprise a SIP INVITE message described above. In some embodiments, the invite message may include one or more multicast IP addresses for one or more multicast groups. In FIG. 10, the invite message may include a multicast IP address for a multicast group 1005 and a multicast IP address for a multicast group 1050. In some aspects, the multicast group 1005 may be assigned to a codec that is supported by all the terminals 110A-F (i.e., a mandatory codec). As shown in FIG. 10, the multicast group 1050 may be assigned to a codec that is supported by terminals 110A and 110D and the terminal/media gateway 450 (i.e., an optional codec).

Terminals 110A-D join or register with multicast group 1005 and terminals 110A and 110D and terminal/media gateway 450 join or register with multicast group 1050. In some aspects, the terminals 110E and 110F may not be capable of performing mixing operations or may not support a codec of one of the multicast group 1005 or multicast group 1050 and may utilize terminal/media gateway 450 to mix data streams received via the multicast group 1005 or 1050. As shown, terminals 110E and 110F communicate to the multicast group 1005, multicast group 1050, or both through the terminal/media gateway 450. Once terminals 110A-F and terminal/media gateway 450 have joined (directly or indirectly through the terminal/media gateway 450) either multicast group 1005, multicast group 1050, or both, the terminals 110A-F and terminal/media gateway 450 may transmit and/or receive data streams from the respective multicast group (directly or indirectly through the terminal/media gateway 450).

For example, terminals 110A-D, and terminal/media gateway 450 may transmit data streams 1011, 1012, 1013, 1014, and 1015, respectively to the multicast group 1005. Additionally, terminals 110A-D, and terminal/media gateway 450 may receive data stream 1020 from the multicast group 1005. In some aspects, the data stream 1020 may comprise one or more data streams from one or more of terminals 110A-D, and terminal/media gateway 450. Moreover, terminals 110A, 110D, and the terminal/media gateway 450 transmit data streams 1031, 1032, and 1033, respectively to the multicast group 1050. Terminals 110A and 110D and the terminal/media gateway 450 may receive data stream 1036 from the multicast group 1050. In some aspects, the data stream 1036 may comprise one or more data streams from one or more of terminals 110A-D and terminal/media gateway 450. Terminal 110E may transmit data stream 1041 to the terminal/media gateway 450 for the terminal/media gateway 450 to send to one or more of the multicast groups 1005 and 1050. Similarly, terminal 110F may transmit data stream 1042 to the terminal/media gateway 450 for the terminal/media gateway 450 to send to one or more of the multicast groups 1005 and 1050. The terminal/media gateway 450 may then process the received data streams 1020 and 1036 and transmit a mixed data stream 1043 to terminal 110E and/or transmit a mixed data stream 1044 to terminal 110F.

In some embodiments, for each multicast group (e.g., multicast groups 1005 and 1050) being listened to by a terminal, the terminal (e.g., terminal 110D) can examine the sources (e.g., source IP address) of the data streams to determine which traffic is coming from the same participant and avoid decoding multiple versions of data streams coming from the same source. The terminal can compare the source information to any data streams received from other multicast groups it is listening to. If there is duplication of data streams representations (e.g., data streams coming from the same source), the terminal can choose one codec to decode the data streams, preferably the best quality one. In some aspects, the choice can change on a per-timestamp basis in the event that some loss is experienced for packets traversing through different multicast trees. In some aspects, the selection of which multicast group packets are decoded can be based on the processor resource allocation factor within the terminal. For example, the multicast group 1005 may use a codec corresponding to a lower resource allocation factor than the codec used in multicast data stream in 1050.

Once the data stream is chosen, the terminal can perform a de-jitter buffering on that data stream in relation to previously selected data streams chosen for that data type from the same participant, but not necessarily the same codec type. The de-jittering buffering may be implemented to counter jitter introduced by queuing in a packet switched network. In some aspects, this switching of codec types being fed into the de-jitter buffer may require that the codec information also be maintained in the de-jitter buffer operation to ensure proper decoding after de-jittering. For example, the terminals (e.g., 110A-D and terminal/media gateway 450) may have to maintain a de-jitter buffer for each participant associated with mandatory multicast group 1005 data streams as well as for participants that potentially use the optional multicast group 1050. In an example embodiment, the terminal 110A may maintain four de-jitter buffers to populate data from terminals 110B, 110C, 110D, and terminal/media gateway 450 corresponding to the data stream from the multicast group 1005, and additionally two more de-jitter buffers for terminals 110D and terminal/media gateway 450 corresponding to the data stream from the multicast group 1050. In an example embodiment, the terminal 110A may suspend maintaining a de-jitter buffer for an inactive participant (e.g., based on the RTP packet lengths from a given participant) and create or reuse a de-jitter buffer later when that participate starts sending active frames. The re-use of de-jitter buffer can be handled such that the first active frame packet from a new talker can be placed in a de-jitter buffer (allocated for different talker) whose packets are followed by inactive frames for decoding such that the speech decoder memory transition is better handled. This enables dynamic allocation of de-jitter buffers for incoming data streams and can reduce the number of persistent de-jitter buffers that need to be maintained in a terminal.

In some embodiments, terminals listening to the multicast group can also examine the source of the data stream received to avoid decoding its own data stream when the terminal is also transmitting data streams to the multicast group. Terminals concurrently sending data streams using multiple codec types can encode data streams during the same time frame boundaries and use the same timestamps and/or sequence numbers to allow the terminals listening to the multicast group to identify duplicate representations of the data type.

Some limitations have been identified for media distribution via multicast in 3GPP networks. For example, 3GPP terminals are generally assigned private IP addresses by the mobile network operator (MNO) which can prevent multicast spanning trees from spanning different private IP address domains. As 3GPP packet data network (PDN) gateway PGWs currently do not support the ability to have the multicast trees span across different private IP address domains, this limits conferences using multicast distribution to terminals in the same operator's private IP address domain, i.e., where the private IP address assignments are unique. Additionally, there may be a security risk in 3GPP networks as the joining of a multicast spanning tree is not authenticated, allowing an attacker to listen in on any multicast group conference. Also, there may be no standardized mechanism in 3GPP networks that enables the terminal to request assignment of an available multicast IP address for its use.

Figure 11:
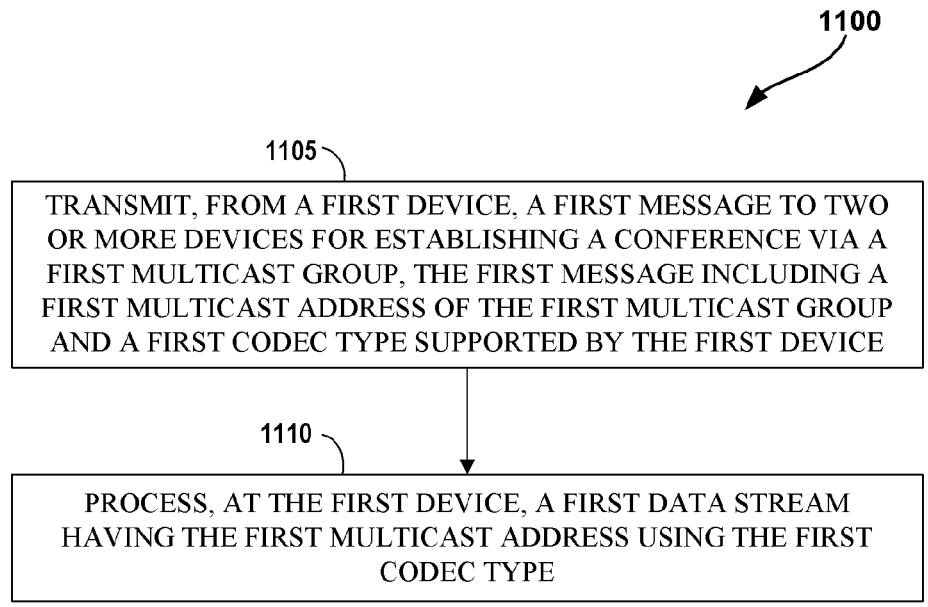
FIG. 11 is a flowchart of an exemplary method for communication in a conference.

FIG. 11 is a flowchart of an exemplary method 1100 for communication in a multimedia conference. The method 1100 shown in FIG. 11 may be implemented via one or more devices in the conference architectures 100, 200, 300, 400, 500, and 1000 in FIGS. 1-5 and 10. In some aspects, the method 1100 may be implemented by a device similar to the user terminals 110A-F, the centralized processor 125, and/or the terminal/media gateway 450 of FIGS. 1-5, 10, or any other suitable device.

At block 1105 a terminal (e.g., terminal 110A of FIG. 10) may transmit a first message to two or more devices for establishing a conference via a first multicast group. The first message may include a first multicast address of the first multicast group and a first codec type supported by the first device. At block 1110, the terminal processes a first data stream having the first multicast address using the first codec type.

Figure 12:
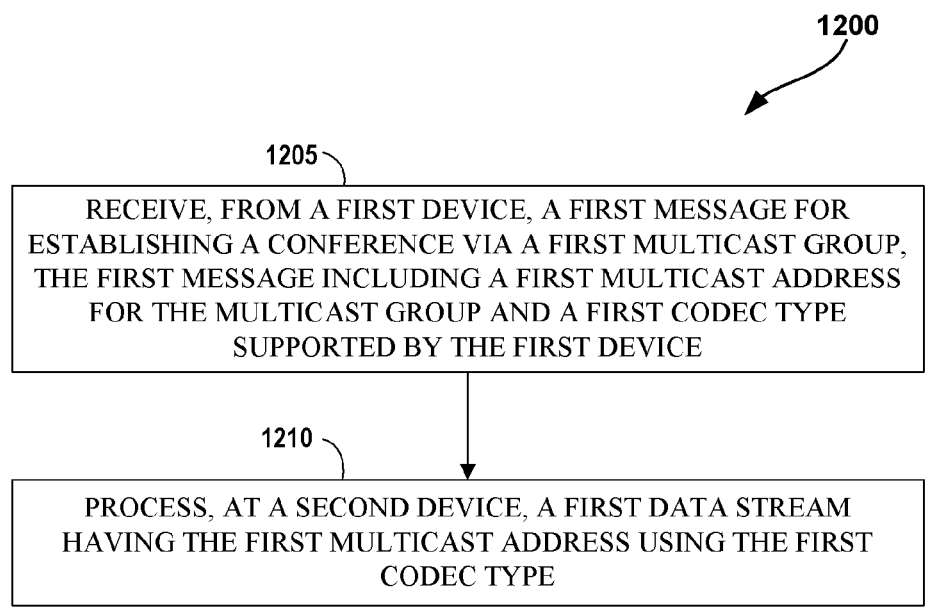
FIG. 12 is a flowchart of another exemplary method for communication in a conference.

FIG. 12 is a flowchart of an exemplary method 1200 of codec negotiation in a multimedia conference. The method 1200 shown in FIG. 12 may be implemented via one or more devices in the conference architectures 100, 200, 300, 400, 500, and 1000 in FIGS. 1-5 and 10. In some aspects, the method 1100 may be implemented by a device similar to the user terminals 110A-F, the centralized processor 125, and/or the terminal/media gateway 450 of FIGS. 1-5, 10, or any other suitable device.

At block 1205 a terminal (e.g., terminal/media gateway 450 of FIG. 10) may receive, from a first device, a first message for establishing a conference via a first multicast group. The first message including a first multicast address for the multicast group and a first codec type supported by the first device. At block 1210, the terminal processes a first data stream having the first multicast address using the first codec type.

In some aspects, the possible limitations of multicast distribution described above can be mitigated by using a simple focus (e.g., centralized processor 125 or terminal/media gateway 450) for data handling. This conference architecture configuration, which may be described as single source multi-unicast, may use the centralized processor 125, a terminal 110, or the terminal/media gateway 450 to essentially perform the function of the multicast routers, i.e., replicating data and sending it down to the appropriate terminals.

Figure 13:
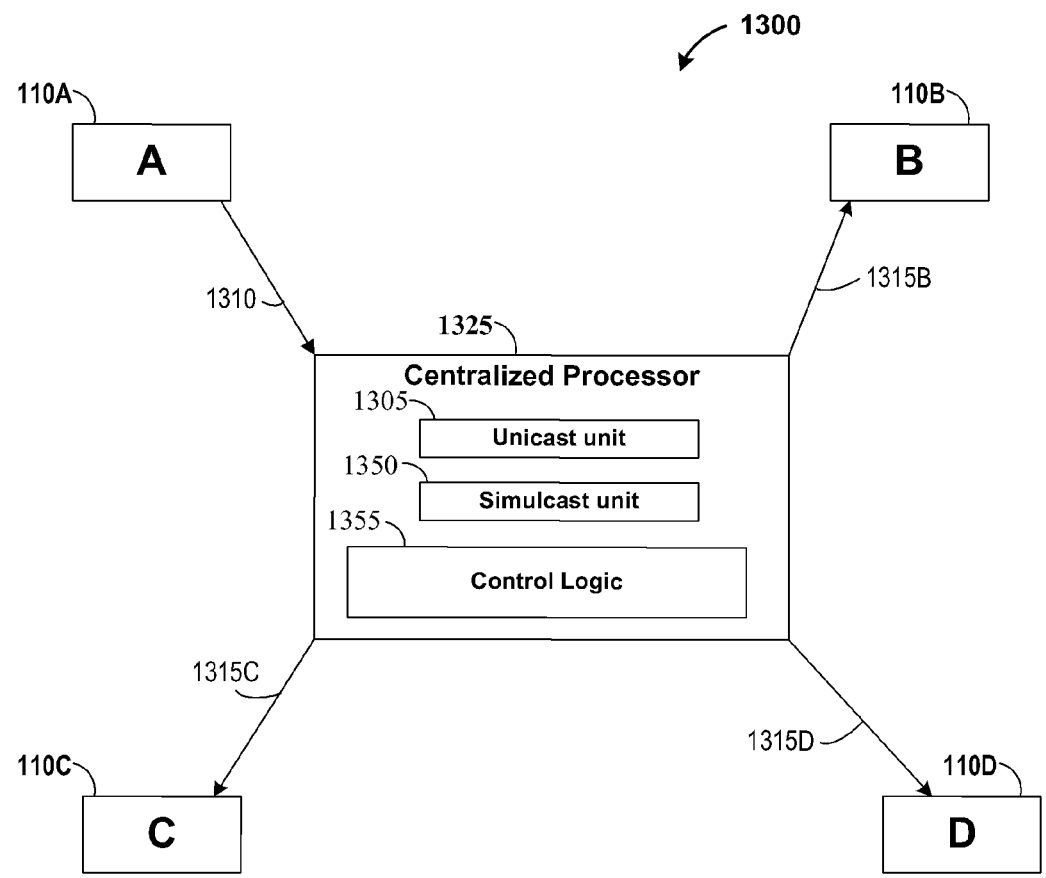
FIG. 13 is a diagram of an exemplary single source multi-unicast architecture for multiple participants using a centralized processor or conference focus.

FIG. 13 is diagram of an exemplary single source multi-unicast (SSMU) architecture 1300 for multiple participants using a centralized processor 1325. The exemplary SSMU architecture 1300 comprises terminals 110A-D and a centralized processor 1325. The centralized processor 1325 may comprise a unicast unit 1305, a simulcast unit 1350, and a control logic 1355. The unicast unit 1305 may be configured to receive a unicast stream and generate a copy comprising a mandatory codec data stream for transmission to conference participants. For example, if terminal 110A sends a unicast stream to centralized processor 1325 using a mandatory codec used in the conference based on the codec negotiation (e.g., an adaptive multi-rate (AMR) speech codec or a H.264 video codec), then the centralized processor makes or produces three copies of the unicast stream and sends to the terminals 110B, 110C, and 110D. The simulcast unit 1350 may be configured to receive a simulcast stream and generate a simulcast transmission comprising one or both of the mandatory codec data stream and an optional codec data stream. For example, if the terminal 110A sends a simulcast stream to the centralized processor 1325 using a mandatory codec (e.g., AMR) and an optional codec (e.g., EVS) then the centralized processor depending on the capabilities of the terminals 110B, 110C, and 110D sends one or both of the mandatory codec data stream and the optional codec data stream to terminals 110B-D.

The control logic 1355 may be configured to determine whether to use the unicast unit 1305 or the simulcast unit 1350 for receiving the data streams from the terminals as well as for identifying which of the transmissions to send to the terminals 110A-D. In some aspects, the centralized processor 1325 may be configured to essentially perform the function of the multicast routers. For example, the centralized processor 1325 may be configured to receive a data stream (e.g., data stream 1310) from one of the terminals 110A-D (e.g., terminal 110A), replicate the received data stream to produce one or more copies (a first copy, a second copy, a third copy, etc.), and transmit the replicated copies of the data steam (e.g., data streams 1315B-D) to the other terminals in the conference (e.g., terminals 110B-D).

In a single source multi-unicast topology 1300 (e.g., FIG. 13), a conference initiator such as terminal 110A may send an offer to the centralized processor 1325. In certain embodiments, the terminal 110A considers its own encoding/decoding capabilities when determining the offer and may configure the offer based on some or all of its own encoding/decoding capabilities. These capabilities may include a maximum number of concurrent encoding and decoding that can be performed by the terminal 110A for particular combinations of codecs. Before responding to the offer by sending the answer, the centralized processor 1325 can consider the encoding/decoding capabilities of the other conference participants, terminals 110B-D and may configure the response to the offer based on some or all of the encoding/decoding capabilities of some or all of the other conference participants. These capabilities may include a maximum number of concurrent encoding and decoding that can be performed by each terminal 110B-D for particular combinations of codecs.

In some aspects, the offer may comprise a session description protocol (SDP) offer message or first message. In some aspects, the message sent by the centralized processor 1325 in response to the offer from terminal 110A may comprise an SDP answer message.

In a multi-unicast topology 1000 (e.g., FIG. 10), the conference initiator or terminal 110A can consider its own encoding/decoding capabilities before sending the offer to the conference participants or terminals 110B-110F and may configure the offer based on some or all of its own encoding/decoding capabilities. These capabilities may include a maximum number of concurrent encoding and decoding that can be performed by the terminal 110A for particular combinations of codecs. In some implementations, the terminal 110A considers the encoding/decoding capabilities of the other conference participants or terminals 110B-110F before sending the offer and may configure the offer based on some or all of the encoding/decoding capabilities of some or all of the other conference participants. These capabilities may include a maximum number of concurrent encoding and decoding that can be performed by each terminal 110B-110F for particular combinations of codecs.

In both the single source multi-unicast topology 1300 and the multi-unicast topology 1000, concurrent encoding/decoding capabilities can be exchanged based on the offer and answer.

The concurrent encoder capabilities can be described using a session description protocol (SDP) attribute such as a simulcast attribute. For each codec that can be operated concurrently, the SDP format tokens (usually corresponding to real-time transport protocol (RTP) payload) for each of these codecs are listed in the send direction, indicating that they can be simulcast by the source.

The concurrent decoder capabilities can be described using multiple m lines. For example, if a terminal 110 can receive and decode up to N−1 AMR-NB or AMR-WB audio streams, the offer would list N−1 m lines, with each m line listing that either AMR-NB or AMR-WB can be received.

If the terminal 110 has the ability to trim the number of received media streams to what it actually decodes, the terminal 110 can advertise more m lines than it actually can concurrently decode.

If the terminal 110 has limitations on the number of RTP streams it can concurrently send or receive, the terminal 110 can indicate this by limiting the number of codecs that it lists in the SDP simulcast attribute and limiting the number of m lines which it can receive, respectively Table 4 shows an example SIP OPTION request from the centralized processor 1325 such as in FIG. 13 or from the conference initiator or terminal 110A such as in FIG. 10. Table 5 shows an example SIP OPTION response from the conference participants or terminals 110B-D to the centralized processor 1325 or the conference initiator or terminal 110A. The SIP OPTION response includes the SDP Offer of the conference participant. From Table 5, the conference participant or terminal 110 can allow for three concurrent encoding and three concurrent decoding of audio streams.

To minimize the need to transcode any media and also enable in-terminal mixing of media in the participants or terminals 110 without exceeding their concurrent codec capabilities, the terminals 110 and centralized processor 1325 can use a concurrent codec capability format and exchange protocol.

TABLE 4

Example SIP OPTION request
SIP OPTION request

OPTIONS sip:cccEx@mmcmh.com SIP/2.0
To: <sip:cccEx@mmcmh.com>
From: P1 <sip:p1@msmtsi.com>;tag=TR26980
Call-ID: abcdefgh
CSeq: 16384 OPTIONS
Max-Forwards: 100
Via: SIP/2.0/UDP msmtsi.com; branch=z9hG4bKxxxxxx
Contact: <sip:p1@msmtsi.com>
Accept: application/sdp

TABLE 5

Example SIP OPTION response
SIP OPTION response

SIP/2.0 200 OK
Via: SIP/2.0/UDP msmtsi.com; branch= z9hG4bKxxxxxx;
received=10.10.10.10
To: <sip:cccEx@mmcmh.com>;tag= TR26980E
From: P1 <sip:p1@msmtsi.com>;tag=TR26980
Call-ID: abcdefgh
CSeq: 16384 OPTIONS
Allow: INVITE, ACK, CANCEL, OPTIONS, BYE
Accept: application/sdp
Content-Type: application/sdp
m=audio 49152 RTP/AVP 96 97 98
b=AS:42
a=tcap:1 RTP/AVPF
a=pcfg:1 t=1
a=rtpmap:96 EVS/16000/1
a=fmtp:96 br=13.2-24.4; bw=wb-swb; max-red=220
a=rtpmap:97 AMR-WB/16000/1
a=fmtp:97 mode-change-capability=2; max-red=220
a=rtpmap:98 AMR/8000/1
a=fmtp:98 mode-change-capability=2; max-red=220
a=ptime:20
a=maxptime:240
a=simulcast: send pt:96;97;98 recv pt:96,97,98
m=audio 49154 RTP/AVP 101 102 103
b=AS:42
a=tcap:1 RTP/AVPF
a=pcfg:1 t=1
a=recvonly
a=rtpmap:101 EVS/16000/1
a=fmtp:101 br=13.2-24.4; bw=wb-swb; max-red=220
a=rtpmap:102 AMR-WB/16000/1
a=fmtp:102 mode-change-capability=2; max-red=220
a=rtpmap:103 AMR/8000/1
a=fmtp:103 mode-change-capability=2; max-red=220
a=ptime:20
a=maxptime:240
a=simulcast: recv pt:101,102,103
m=audio 49156 RTP/AVPF 104 105 106
b=AS:42
a=tcap:1 RTP/AVPF
a=pcfg:1 t=1
a=recvonly
a=rtpmap:104 EVS/16000/1
a=fmtp:104 br=13.2-24.4; bw=wb-swb; max-red=220
a=rtpmap:105 AMR-WB/16000/1
a=fmtp:105 mode-change-capability=2; max-red=220
a=rtpmap:106 AMR/8000/1
a=fmtp:106 mode-change-capability=2; max-red=220
a=ptime:20
a=maxptime:240
a=simulcast: recv pt:104,105,106

In some embodiments, when setting up individual sessions with the call participants (e.g., terminals 110B-D), the centralized processor 1325 offers one or more codec types that were offered or pre-selected by the initiator terminal 110A in a first message to the centralized processor 1325. In some aspects, the codec types that are offered by the centralized processor 1325 can be, for example, one or more mandatory codec types supported by all terminals in the conference session, and one or more optional codec types supported by a subset of the terminals 110A-D. Further, the offered codec types can be different for different data streams, e.g., audio or video. In some aspects, the centralized processor 1325 can choose to only offer the one or more mandatory codecs provided by the initiator terminal 110A, which may guarantee that all terminals 110B-D use these mandatory codecs and no transcoding may be required.

In some embodiments, the centralized processor 1325 could also choose to offer some optional codecs to improve conference quality or performance. To avoid transcoding and support use of optional codecs, the centralized processor 1325 may offer the optional codecs as being simulcast with a corresponding mandatory codec stream for the same data type, (e.g., the participants wishing to receive an optional codec data stream may also listen for the mandatory codec data stream). For example, if a terminal (e.g., terminal 110B) supports both H.264 (mandatory codec) and H.265 (optional codec), the centralized processor 1325 may transmit a simulcast transmission including a H.264 data stream and a H.265 data stream. Similarly, a participant terminal (e.g., terminal 110B) sending data using the optional codec H.265 can also simulcast a representation of the same data using the mandatory codec H.264 for that data type (e.g., audio or video). This is in case one of the participants is unable to encode or decode its data using the optional codec data stream.

In some embodiments, for a particular session, the codecs that are mandatory and optional will depend on the capabilities of the terminals 110 involved. In cases where there are more than two codecs that can be used to encode a particular media type, there can be a hierarchy of optional and mandatory codecs. For example, consider the case where the AMR-NB, AMR-WB, and EVS codecs can all be used by some participants (e.g., terminals 110B-D) in a conference, while others can only support AMR-WB+AMR-NB, and yet others only support AMR-NB. If a terminal 110 chooses to send only AMR-NB encoded content, then it is able to communicate with all the other participants 110 without requiring any transcoding by the centralized processor 1325. If a terminal 110 chooses to send AMR-WB content then it must also send AMR-NB content to ensure communication with all terminals 110. Finally, a terminal 110 that wishes to send EVS must also at least send AMR-NB encoded content. However, to also maximize voice quality in its communication with terminals 110 that can decode AMR-WB, the terminal 110 that sends EVS may also choose to send AMR-WB encoded content.

In certain embodiments, the central processor 1325 can indicate which codecs are mandatory and which are optional using the SDP. In one exemplary embodiment, a new SDP parameter (e.g., 'con_recv') is defined to describe the status of the codecs using a list of codec IDs (e.g., a list of RTP Payload types 'PT', or 'RID') delimited by commas or semi-colons. In some embodiments, 'con_recv: 97, 98, 99' is used to indicate that the central processor 1325 can concurrently receive three media streams which are listed in order of decreasing preference (i.e., 97 provides the best quality, followed by 98, and 99), and the last ID ('99') being the mandatory stream that must be sent by any participant or terminal 110B-D.

In certain embodiments, multiple codecs can be optional and/or multiple codecs can be mandatory. The status of multiple codecs can be described by using one or more delimiter terms in the list of codec IDs. For example, if the list of codec IDs includes the same delimiter (e.g., a comma or other suitable delimiter term) between each codec then each of the listed codecs is a mandatory codec. For example, if the list of codec IDs is 'con_recv: 97, 98, 99' then streams 97, 98, and 99 are mandatory. In another example, if the list of codec IDs includes one unique delimiter term (e.g., a semicolon or other suitable delimiter term) different from the other delimiter terms (e.g., a comma or other suitable delimiter term) then the codecs on a first side of the unique delimiter term are all mandatory while the codecs on the opposite side are all optional or vice versa. For example, if the list of codec IDs is 'con_recv: 97; 98, 99' then stream 97 is optional while streams 98 and 99 are mandatory.

In certain embodiments, a new SDP parameter (e.g., 'mand recv') is defined to identify the codec ID of the mandatory stream. In some embodiments, 'mand recv: 99' is used to indicate that the ID ('99') is the mandatory stream that must be sent by any participant or terminal 110B-D.

In certain embodiments, the central processor 1325 explicitly marks one of the codec IDs in a list as mandatory using a special character such as a * or # character, e.g., 'simulcast: recv 97; 98; #99' where this # indicates that the codec with ID 99 must be sent in the simulcast as mandatory.

In an example embodiment, the centralized processor 1325 may be set up as a conference focus and the terminal 110A is the initiator terminal. As shown in FIG. 13, the terminal 110A transmits a data stream 1310 to the centralized processor 1325. The data stream 1310 may comprise one or more data streams. For example, the data stream 1310 may comprise a mandatory codec data stream and an optional codec data stream. In some embodiments, the terminal 110A sends a simulcast data stream 1310, multiple representations of the same source (e.g., same video or audio data), which includes the mandatory codec data stream and the optional codec data stream. In some aspects, the centralized processor 1325 receives the simulcast data stream 1310 and the centralized processor 1325 or the control logic 1355 may transmit a data stream 1315B which comprises both the mandatory codec data stream via a unicast transmission using the unicast unit 1305 and the mandatory codec data stream and the optional codec data stream via a simulcast transmission using the simulcast unit 1350 to a terminal (e.g., terminal 110B) which supports both the mandatory codec and the optional codec. Additionally, the centralized processor 1325 or the control logic 1355 may transmit a data stream 1315C which comprises only the mandatory codec data stream via a unicast transmission using the unicast unit 1305 to a terminal that only supports the mandatory codec (e.g., terminal 110C). In some aspects, the centralized processor 1325 or the control logic 1355 may transmit a data stream 1315D which comprises only the simulcast transmission discussed above to a terminal (e.g., terminal 110D) which supports both the mandatory codec and the optional codec.

In some aspects, after all the individual sessions between the centralized processor 1325 and the terminals 110B-D are established, the centralized processor 1325 could re-negotiate the codecs to disable transmission and reception of optional codec data if there are no, or a very limited number of, participants who can decode or encode the optional codec stream. For example, the initiator centralized processor 1325 may negotiate with the terminals 110B-D to determine which codecs (e.g., mandatory and/or optional codecs) each terminal can support. At a later time (e.g., during the conference session), the centralized processor 1325 may determine that only the initiator terminal 110A can support the optional codec. Accordingly, the centralized processor 1325 may send a message to the initiator terminal 110A to renegotiate which codecs are supported by the conference.

In some aspects, the centralized processor 1325 may request that the initiator terminal only send mandatory codec data streams and stop sending the optional codec. In some embodiments, the centralized processor 1325 may also determine that the optional codec is not being used enough to justify supporting the optional codec or may determine that in order to save on bandwidth or latency requirements that the optional codec should not be supported by the conference. In some aspects, during the renegotiation the centralized processor 1325 may determine that an additional or substitute optional codec should be used based on the codec capabilities and usage of the terminals. Additionally, after establishment of a conference session, the centralized processor 1325 may transmit a data stream 1315 to the terminals 110B-D.

In some aspects, the centralized processor 1325 may enable a transmitter 125 of a terminal 110 to use better quality optional codec without simulcasting media encoded with a mandatory codec as this would exceed the transmitter's 125 concurrent encoding capabilities. To enable communication with other terminals 110 that can only decode the mandatory codec, the centralized processor 1325 has to transcode media from the optional codec format to the mandatory codec format and send this transcoded stream to the terminals 110 that can only decode the mandatory codec.

In some aspects the centralized processor 1325 may choose to mix some content so that some terminals 110 do not have to concurrently decode the streams.

RTP Stream Pause, Reuse, Replace, and Resume

Figure 15:
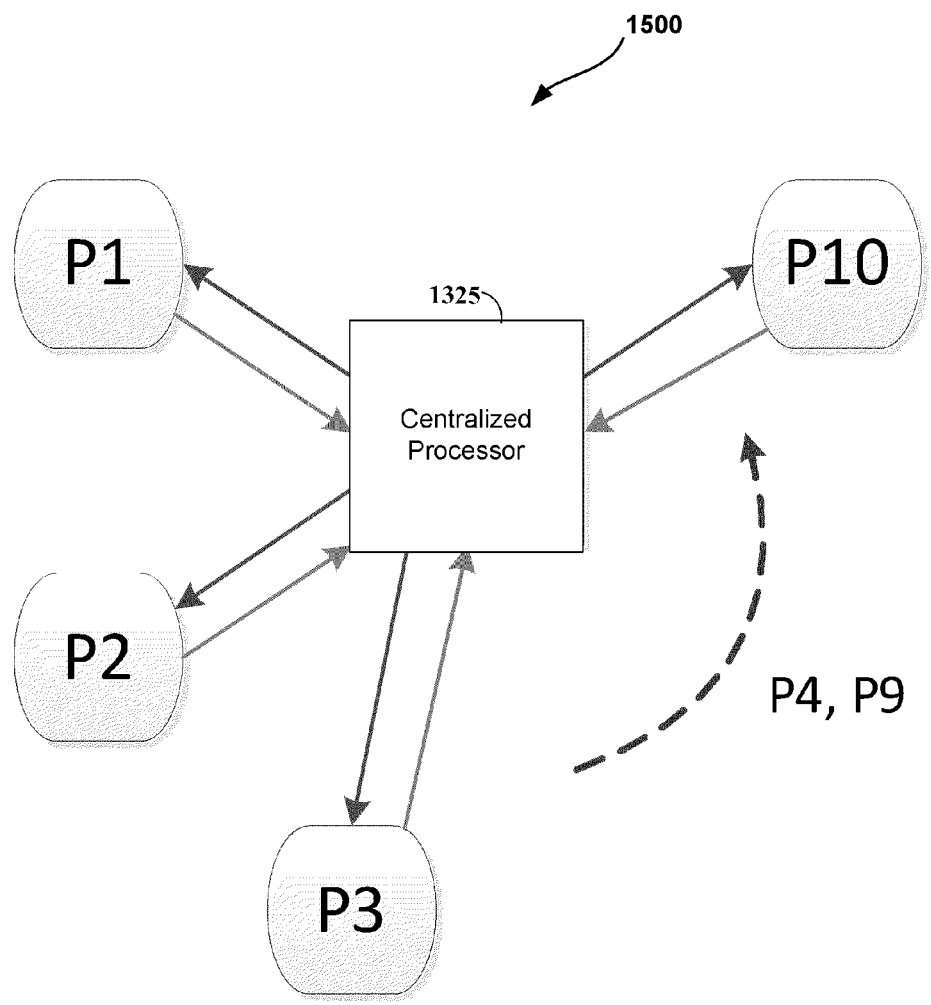
FIG. 15 is a diagram of an exemplary single source multi-unicast architecture for multiple participants using a centralized processor which can reduce a size of offers transmitted between the participants by performing RTP pause, reuse, replace, and resume actions.

FIG. 15 is a diagram of an exemplary single source multi-unicast architecture 1500 for multiple participants P1-P10. The single source multi-unicast architecture 1500 employs a centralized processor or conference focus 1325. The centralized processor 1325 is configured to reduce a size of offers transmitted between the participants P1-P10 by performing RTP pause, reuse, replace, and resume actions. As explained above, the SIP OPTION response illustrated in Table 5 includes the offer of the conference participant.

As explained above, the terminals 110 can use SDP parameters to implicitly exchange (e.g., based on multiple m-lines and using the 'simulcast' parameter) the concurrent encoding/decoding capabilities with the centralized processor 1325. When a conference includes a large number of terminals or participants P1-P10 the size of the offer listing the concurrent codec capabilities (CCC) using the above parameters can increase considerably. For example, on the decoder side, the number of SDP lines needed is based on the number of conference terminals or participants P1-P10 and the codecs supported by each of the conference participants P1-P10. Due to different levels of decoding complexity, which codecs can be operated concurrently can vary with the choice of codecs. It is possible that participants P1-P10 will not be able to concurrently decode all of the codec types if one of the more complex decoders is being used. Another result of the different decoding complexities for each codec type is that the total number of concurrently supported decoders can vary with the codec choice. For example, a participant P1-P10 may be able to concurrently decode 6 EVS streams or up to 10 AMR-NB streams. If a participant P1-P10 has the ability to decode up to NMAX streams when using the least complex decoder(s) and up to NMIN streams when using the most complex decoder(s), then it would have to describe separate alternative media stream specifications for NMIN, NMIN+1, NMIN+2, NMIN+3, . . . NMAX concurrently decoded streams.

To reduce the size of the offer when a conference includes a large number of participants P1-P10, the centralized processor 1325 can perform RTP pause, reuse, replace, and resume actions. For example, in the offer the centralized processor 1325 may use only three m-audio lines (for a=send) even though there are 10 participants P1-P10 or terminals 110 in the call. The participants P1 through P10 will receive the offer from the centralized processor 1325 and respond with an answer accepting the offer. For the case where there is only one talker (e.g., P1) at a given time, the centralized processor 1325 would route the RTP packets from P1 to the other participants (P2-P10). For the case when two talkers are talking (e.g., P1, P2) or three talkers (e.g., P1, P2, P3) talking at a given time, the centralized processor 1325 routes the packets to the other participants P4-P10. For the case, when one of the talkers (e.g., P3) stops and another new talker (P4) takes the floor and begins talking, the centralized processor 1325 can pause the RTP stream associated with P3, and reuse the same RTP stream for the P4 talker.

However, if the synthesis memories from P3 are carried over to the current talker stream P4, then the beginning of the RTP associated with P4 may include undesirable sounds and artefacts. In certain embodiments, these undesirable sounds and artefacts are reduced or eliminated by the centralized processor 1325 briefly replacing the RTP stream to be used by P4 with one or more frames. In certain embodiments, the one or more frames is a silence indicator (SID) frame, a discontinuous transmission (DTX) frame, a series of SID frames, a series of DTX frames, or a unique pattern signaling to the participants that talker P3 is switching to talker P4 within the same RTP stream. The use of the one or more frames improves the decoder's ability to refresh its synthesis memories. If the synthesis memories are not adequately refreshed, then the undesirable sounds and artefacts may occur due to the synthesis memories from the previous talker P3 being carried over to the current talker stream for P4. In certain embodiments, subsequent to a "replace" operation, the centralized processor 1325 resumes the packet transmission of P4 within the third RTP indicator previously used for P3.

Media Type Swap at the Centralized Processor

In certain embodiments, in order to minimize the number of SDP lines in the offer the centralized processor 1325 may only include certain codecs, such as Enhanced Voice Services (EVS). For the participants that answer with an SDP with their capability of a lower quality, such as AMR-WB, the centralized processor 1325 may accept, but may swap the EVS media type of the packets to the lower quality AMR-WB before sending to the participants, terminals 110A-D.

Furthermore, for the participants, terminals 110A-D, that support both EVS and AMR-WB, the centralized processor 1325 may alternatively send the AMR-WB RTP packet as either with media type AMR-WB or EVS depending on the channel conditions and the concurrent codec capability of the participant, terminals 110A-D.

In some aspects, each of the conference participants, terminals 110A-D, may encode data using at least one mandatory codec for the data type. If a participant chooses to encode using an optional codec then it may simulcast this optional codec data stream along with the mandatory codec data stream for the same data type. When simulcasting the data stream, the transmitting terminal 110 may use the same RTP timestamps and sequence numbers for the different representations of the same source content.

In some embodiments, the single source multi-unicast architecture 1300 may provide certain non-limiting benefits over other decentralized conference architectures. In a non-limiting example, the terminal sending data (e.g., terminal 110A) only has to send one copy of each encoded packet to the centralized processor 1325, minimizing the uplink bandwidth. Additionally, the unicast traffic sent to and from the centralized processor 1325 can traverse network address translator (NAT) boxes serving MNO's private IP address domains, thus enabling the conference to span multiple private IP address domains. Moreover, provided with the appropriate credentials and keys, the centralized processor 1325 can authenticate users attempting to listen in on, and send data to, the conference. In some aspects, there may be no need to reserve or be assigned a multicast IP address for the conference. The centralized processor 1325 is assigned its own unique (possibly private) IP address using standard assignment protocols supported in the operator's network, e.g., Dynamic Host Configuration Protocol (DHCP). In some aspects, the centralized processor 1325 does not have to perform any transcoding, merely replication of data traffic. Not only is this less-computationally expensive, it would also allow the data traffic sent to be encrypted end-to-end as the centralized processor 1325 does not have to decrypt the data in order to replicate and send it to all the terminals.

In an example embodiment, the simulcast data stream transmitted by a terminal (e.g., terminal 110A) may include two or more streams coding or representing the same source using, 1) a mandatory codec and an optional codec, or 2) only a mandatory codec at two different bit rates, or 3) a scalable coding with embedded inter-layer prediction. For example, a terminal (e.g., terminal 110A) may encode a speech frame using both a mandatory codec (e.g., AMR) and an optional codec (e.g., EVS) and generate a simulcast data stream for transmission to the centralized processor 1325. Upon receiving the simulcast data stream, the centralized processor 1325 may identify the simulcast data and transmit one or both of the mandatory and optional codec data streams based on the decoding capabilities of the terminals 110B-D.

In another embodiment, when the terminal 110B is receiving the optional codec data stream and has decided to switch to receiving only the mandatory codec data stream, then the transition from receiving the optional codec to the mandatory codec must be signalled by the terminal 110B to the centralized processor 1325. When the data stream switch happens, the terminal 110B must be capable of handling any codec memory resets or seamless transition through post-processing of decoded data streams (e.g., bandwidth compensation while transitioning from a super-wideband to wideband or narrowband, such that there are no abrupt changes to the signal bandwidth causing perceptual artefacts).

In another example embodiment, the terminal (e.g., 110A) may encode the speech frame using a same codec (e.g., EVS) at different bit rates (e.g., 13.2 kbps and 24.4 kbps) or bandwidths (e.g., SWB or WB) and generate a simulcast data stream for transmission to the centralized processor 1325. The centralized processor 1325 may identify the simulcast data and transmit one or both of the data streams to provide channel redundancy in case of frame erasures; or allow the centralized processor 1325 to decide which stream to transmit to the terminals without transcoding. This way, in some aspects, the centralized processor 1325 may transmit a higher bit rate data stream to terminals with sufficient network bandwidth and transmitting a lower bit rate data stream to terminals in congestion.

In another example embodiment, the terminal (e.g., terminal 110A) may encode the input signal using a scalable coding with increasing quality and generate a simulcast data stream for transmission to the centralized processor 1325. Upon receiving the simulcast data stream with embedded scalable coding, the centralized processor 1325 may decide the number of layers that need to be transmitted to each of the terminals based on a prior negotiated bandwidth/bitrate or based on a network feedback providing the channel conditions. The scalable coding can be a video coding using H.265 with base layer coding with additional layers improving quality or a ITU-T G.718 speech codec with 32 kbps as the base line coding with every 4 kbps improving quality and error resilience.

Figure 14:
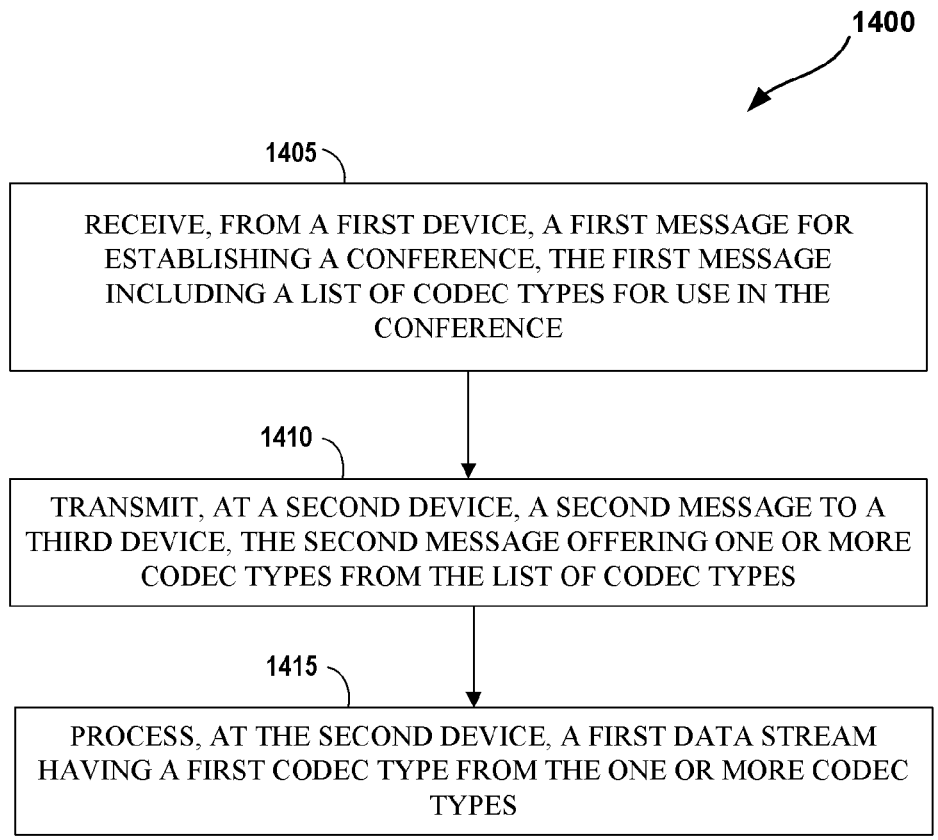
FIG. 14 is a flowchart of an exemplary method for communication in a conference.

FIG. 14 is a flowchart of an exemplary method 1400 for communication in a multimedia conference. The method 1400 shown in FIG. 14 may be implemented via one or more devices in the conference architectures 100, 200, 300, 400, 500, 1000, 1300 in FIGS. 1-5, 10, and 13. In some aspects, the method 1400 may be implemented by a device similar to the user terminals 110A-F, the centralized processor 125, 1325 and/or the terminal/media gateway 450 of FIGS. 1-5, 10, 13, or any other suitable device.

At block 1405, a centralized processor (e.g., centralized processor 1325 of FIG. 13) may receive, from a first device, a first message for establishing a conference, the first message including a list of codec types for use in the conference. At block 1410, the centralized processor 1325 may transmit, at a second device, a second message to a third device, the second message offering one or more codec types from the list of codec types. At block 1415, the centralized processor 1325 may process, at the second device, a first data stream having a first codec type from the one or more codec types.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, means for transmitting a first or offer message to two or more devices may comprise a transmitter 125 or an antenna 135 of the terminals 110A-D. Additionally, means for receiving a second or response message may comprise a receiver 120 or an antenna 135 of the terminals 110A-D. Additionally, means for determining whether the two or more devices may continue to participate in the conference may comprise a processor 115 of the user terminals 110A-D. Further, means for receiving a first or offer message from a device may comprise a receiver 120 or an antenna 135 of the terminals 110A-D. Also, means for transmitting a second or response message may comprise a transmitter 125 or an antenna 135 of the terminals 110A-D.

Information and signals may be represented using any of a variety of different technologies and techniques. For example, data, instructions, commands, information, signals, bits, symbols, and chips that may be referenced throughout the above description may be represented by voltages, currents, magnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for communication between participants in a conference, the method comprising:

receiving, from a first device at a second device, a first message for establishing a conference, the first message including a list of codec types for use in the conference;

transmitting, at the second device, a second message to a third device, the second message offering one or more codec types selected from the list of codec types;

receiving, at the second device from a first participant in the conference, a first data stream having a first codec type from the one or more codec types;

receiving, at the second device from the first participant in the conference, a second data stream having a second codec type from the one or more codec types;

replicating, at the second device, the first data stream to produce a first copy of the first data stream having the first codec type, wherein the first codec type comprises a mandatory codec, which is decodable by all of the participants in the conference; and replicating the second data stream to produce a second copy of the second data stream having the second codec type, wherein the second codec type comprises an optional codec type, which is decodable by a subset of the participants in the conference including a second participant in the conference; and transmitting, to the second participant, the first copy replicated from the first data stream from the first participant and the second copy replicated from second data stream from the first participant.

2. A method for communication between participants in a conference, the method comprising:

receiving, at a first device, a plurality of data streams from a first subset of the conference;

transmitting, at the first device, the plurality of data streams to the conference;

receiving, at the first device, a first data stream from a second subset of the conference;

pausing transmission of one data stream of the plurality of data streams;

reusing the paused data stream for transmission of the first data stream;

replacing the first data stream with one or more silence indicator (SID) frames; and resuming transmission of the first data stream.

3. A method for communication, the method comprising: by a first device:

receiving audio data from a first subset of a plurality of participants in a conference, including:

receiving first audio data from a first participant of the plurality of participants; and receiving second audio data from a second participant of the plurality of participants;

transmitting, to the conference in a plurality of data streams, the received audio data from the first subset of the plurality of participants, including:

transmitting in a first data stream the received first audio data from the first participant of the plurality of participants; and transmitting in a second data stream the received second audio data from the second participant of the plurality of participants; and switching from transmitting in the first data stream audio data received from the first participant to transmitting in the first data stream audio data received from a third participant of the plurality of participants, including:

receiving third audio data from the third participant of the plurality of participants;

pausing transmission of audio data received from the first participant in the first data stream;

transmitting in the first data stream at least one of a silence indicator frame or a discontinuous transmission frame; and transmitting in the first data stream the received third audio data from the third participant of the plurality of participants.

4. The method of claim 3, wherein transmitting in the first data stream at least one of a silence indicator frame or a discontinuous transmission frame comprises:

transmitting a plurality of silence indicator frames in the first data stream.

5. The method of claim 3, wherein transmitting in the first data stream at least one of a silence indicator frame or a discontinuous transmission frame comprises:

transmitting a plurality of discontinuous transmission frames in the first data stream.

6. The method of claim 3, wherein transmitting in the first data stream at least one of a silence indicator frame or a discontinuous transmission frame comprises:

transmitting a plurality of silence indicator frames in the first data stream; or transmitting a plurality of discontinuous transmission frames in the first data stream.

7. A non-transitory computer-readable medium, the medium including code that, when executed, causes an apparatus to perform a method, the method comprising:

receiving audio data from a first subset of a plurality of participants in a conference, including:

receiving first audio data from a first participant of the plurality of participants; and receiving second audio data from a second participant of the plurality of participants;

transmitting, to the conference in a plurality of data streams, the received audio data from the first subset of the plurality of participants, including:

transmitting in a first data stream the received first audio data from the first participant of the plurality of participants; and transmitting in a second data stream the received second audio data from the second participant of the plurality of participants; and switching from transmitting in the first data stream audio data received from the first participant to transmitting in the first data stream audio data received from a third participant of the plurality of participants, including:

receiving third audio data from the third participant of the plurality of participants;

pausing transmission of audio data received from the first participant in the first data stream;

transmitting in the first data stream at least one of a silence indicator frame or a discontinuous transmission frame; and transmitting in the first data stream the received third audio data from the third participant of the plurality of participants.

8. The non-transitory computer-readable medium of claim 7, wherein transmitting in the first data stream at least one of a silence indicator frame or a discontinuous transmission frame comprises:

transmitting a plurality of silence indicator frames in the first data stream.

9. The non-transitory computer-readable medium of claim 7, wherein transmitting in the first data stream at least one of a silence indicator frame or a discontinuous transmission frame comprises:

transmitting a plurality of discontinuous transmission frames in the first data stream.

10. The non-transitory computer-readable medium of claim 7, wherein transmitting in the first data stream at least one of a silence indicator frame or a discontinuous transmission frame comprises:

transmitting a plurality of silence indicator frames in the first data stream; or transmitting a plurality of discontinuous transmission frames in the first data stream.

11. An apparatus for communication, the apparatus comprising:

a processor configured to:

receive audio data from a first subset of a plurality of participants in a conference, including:

receiving first audio data from a first participant of the plurality of participants; and receiving second audio data from a second participant of the plurality of participants;

transmit, to the conference in a plurality of data streams, the received audio data from the first subset of the plurality of participants, including:

transmitting in a first data stream the received first audio data from the first participant of the plurality of participants; and transmitting in a second data stream the received second audio data from the second participant of the plurality of participants; and switch from transmitting in the first data stream audio data received from the first participant to transmitting in the first data stream audio data received from a third participant of the plurality of participants, including:

receiving third audio data from the third participant of the plurality of participants;

pausing transmission of audio data received from the first participant in the first data stream;

transmitting in the first data stream at least one of a silence indicator frame or a discontinuous transmission frame; and transmitting in the first data stream the received third audio data from the third participant of the plurality of participants.

12. The apparatus of claim 11, wherein transmitting in the first data stream at least one of a silence indicator frame or a discontinuous transmission frame comprises:

transmitting a plurality of silence indicator frames in the first data stream.

13. The apparatus of claim 11, wherein transmitting in the first data stream at least one of a silence indicator frame or a discontinuous transmission frame comprises:

transmitting a plurality of discontinuous transmission frames in the first data stream.

14. The apparatus of claim 11, wherein transmitting in the first data stream at least one of a silence indicator frame or a discontinuous transmission frame comprises:

transmitting a plurality of silence indicator frames in the first data stream; or transmitting a plurality of discontinuous transmission frames in the first data stream.

15. An apparatus for communication, the apparatus comprising:

means for receiving audio data from a first subset of a plurality of participants in a conference, the receiving including:

receiving first audio data from a first participant of the plurality of participants; and receiving second audio data from a second participant of the plurality of participants;

means for transmitting, to the conference in a plurality of data streams, the received audio data from the first subset of the plurality of participants, the transmitting including:

transmitting in a first data stream the received first audio data from the first participant of the plurality of participants; and transmitting in a second data stream the received second audio data from the second participant of the plurality of participants; and means for switching from transmitting in the first data stream audio data received from the first participant to transmitting in the first data stream audio data received from a third participant of the plurality of participants, the switching including:

receiving third audio data from the third participant of the plurality of participants;

pausing transmission of audio data received from the first participant in the first data stream;

transmitting in the first data stream at least one of a silence indicator frame or a discontinuous transmission frame; and transmitting in the first data stream the received third audio data from the third participant of the plurality of participants.

* * * * *